US010868488B2

(12) United States Patent
Hoshino et al.

(10) Patent No.: US 10,868,488 B2
(45) Date of Patent: Dec. 15, 2020

(54) SIX-WIRE THREE-PHASE MOTOR, INVERTER DEVICE, AND MOTOR SYSTEM

(71) Applicant: Hitachi Automotive Systems, Ltd., Hitachinaka (JP)

(72) Inventors: Katsuhiro Hoshino, Hitachinaka (JP); Hideki Miyazaki, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 12 days.

(21) Appl. No.: 16/309,642

(22) PCT Filed: Jun. 19, 2017

(86) PCT No.: PCT/JP2017/022452
§ 371 (c)(1),
(2) Date: Dec. 13, 2018

(87) PCT Pub. No.: WO2018/008372
PCT Pub. Date: Jan. 11, 2018

(65) Prior Publication Data
US 2019/0165715 A1 May 30, 2019

(30) Foreign Application Priority Data

Jul. 5, 2016 (JP) .................. 2016-133460

(51) Int. Cl.
*H02P 27/08* (2006.01)
*H02P 6/10* (2006.01)
*H02M 7/5387* (2007.01)

(52) U.S. Cl.
CPC ............... *H02P 27/08* (2013.01); *H02P 6/10* (2013.01); *H02M 7/53871* (2013.01)

(58) Field of Classification Search
CPC ........ H02P 27/04; H02P 27/08; H02P 27/085; H02P 27/12; H02P 27/047; H02P 6/14; H02P 6/28
See application file for complete search history.

(56) References Cited

U.S. PATENT DOCUMENTS 6,005,783 A * 12/1999 Xue ...................... H02M 7/529
                                                    363/36
6,058,031 A *  5/2000 Lyons ................... H02M 7/487
                                                    363/132
(Continued)

FOREIGN PATENT DOCUMENTS

JP      2000-125411 A      4/2000
JP      2006-160030 A      6/2006
(Continued)

OTHER PUBLICATIONS

International Search Report (PCT/ISA/210) issued in PCT Application No. PCT/JP2017/022452 dated Oct. 10, 2017 with English translation (five pages).

(Continued)

Primary Examiner — Rina I Duda
(74) Attorney, Agent, or Firm — Crowell & Moring LLP

(57) ABSTRACT

A six-wire three-phase motor that can realize both of increasing an output and reducing a torque ripple is provided. A six-wire three-phase motor is a six-wire three-phase motor including: a stator including a winding wire wound independently between phases; and a rotor including a plurality of magnets in a circumferential direction, wherein the stator or the rotor is configured in such a manner that a third harmonic current component in a motor current of when an overmodulation voltage based on a PWM signal is applied becomes higher than a third harmonic current com- (Continued)

ponent in a motor current of when a sinusoidal modulation voltage based on the PWM signal is applied.

7 Claims, 25 Drawing Sheets

(56) References Cited

U.S. PATENT DOCUMENTS

| | | | | |
|---|---|---|---|---|
| 8,742,712 | B2* | 6/2014 | Perisic | H02P 27/12 318/400.02 |
| 2006/0290316 | A1 | 12/2006 | Seguchi et al. | |
| 2009/0072647 | A1 | 3/2009 | Hino et al. | |
| 2010/0127656 | A1 | 5/2010 | Ohtani et al. | |
| 2014/0100701 | A1* | 4/2014 | Hakumura | H02P 21/05 700/280 |
| 2014/0225547 | A1* | 8/2014 | Yokozutsumi | H02P 27/085 318/400.27 |

FOREIGN PATENT DOCUMENTS

| | | |
|---|---|---|
| JP | 2008-219956 A | 9/2008 |
| JP | 2009-71910 A | 4/2009 |
| JP | 2010-119201 A | 5/2010 |
| JP | 2014-131373 A | 7/2014 |
| WO | WO 2015/104795 A1 | 7/2015 |

OTHER PUBLICATIONS

Japanese-language Written Opinion (PCT/ISA/237) issued in PCT Application No. PCT/JP2017/022452 dated Oct. 10, 2017 (four pages).

Extended European Search Report issued in European Application No. 17823979.4 dated Feb. 4, 2020 (seven pages).

* cited by examiner

SINUSOIDAL MODULATION

OVERMODULATION

SINUSOIDAL MODULATION

OVERMODULATION

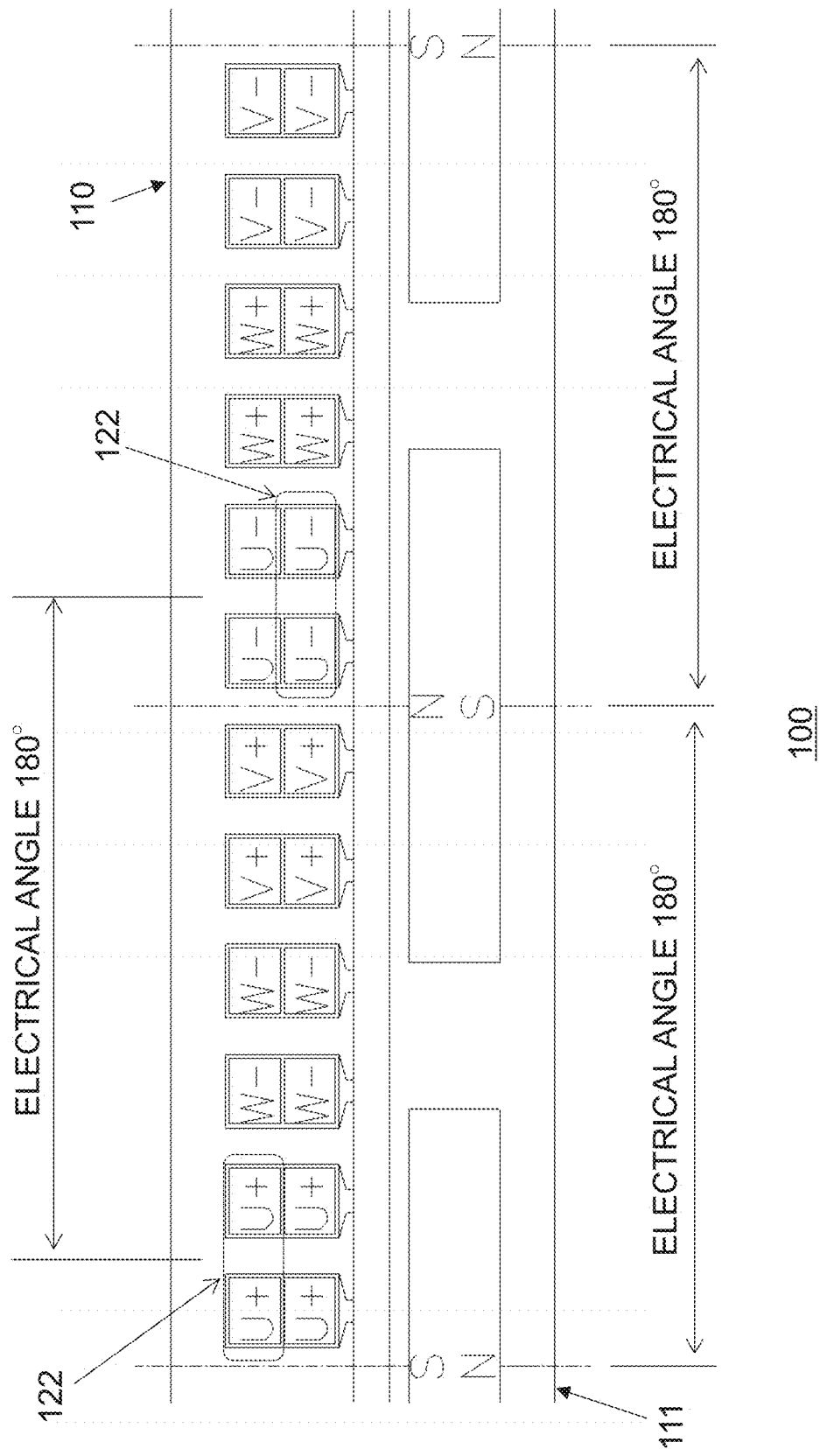

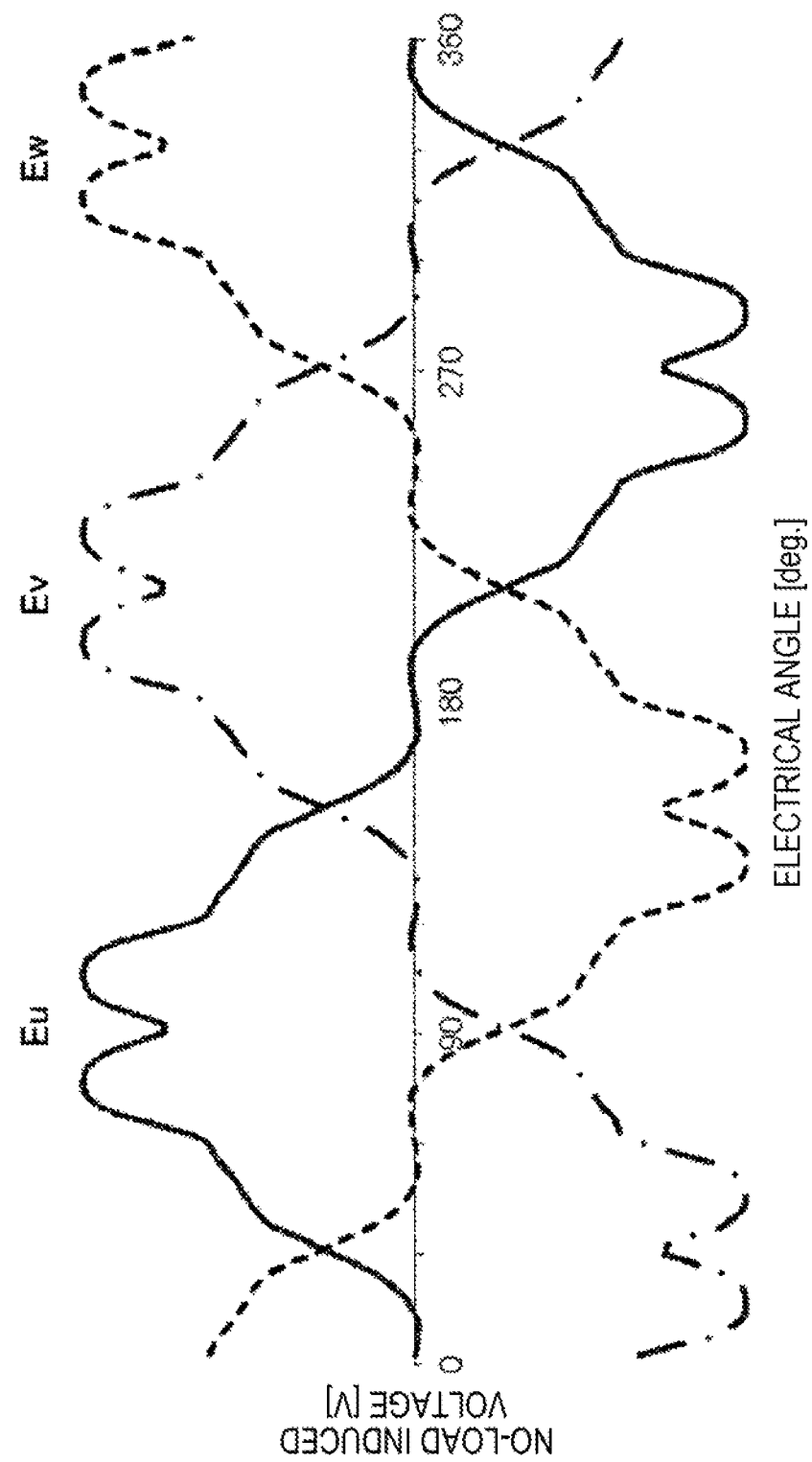

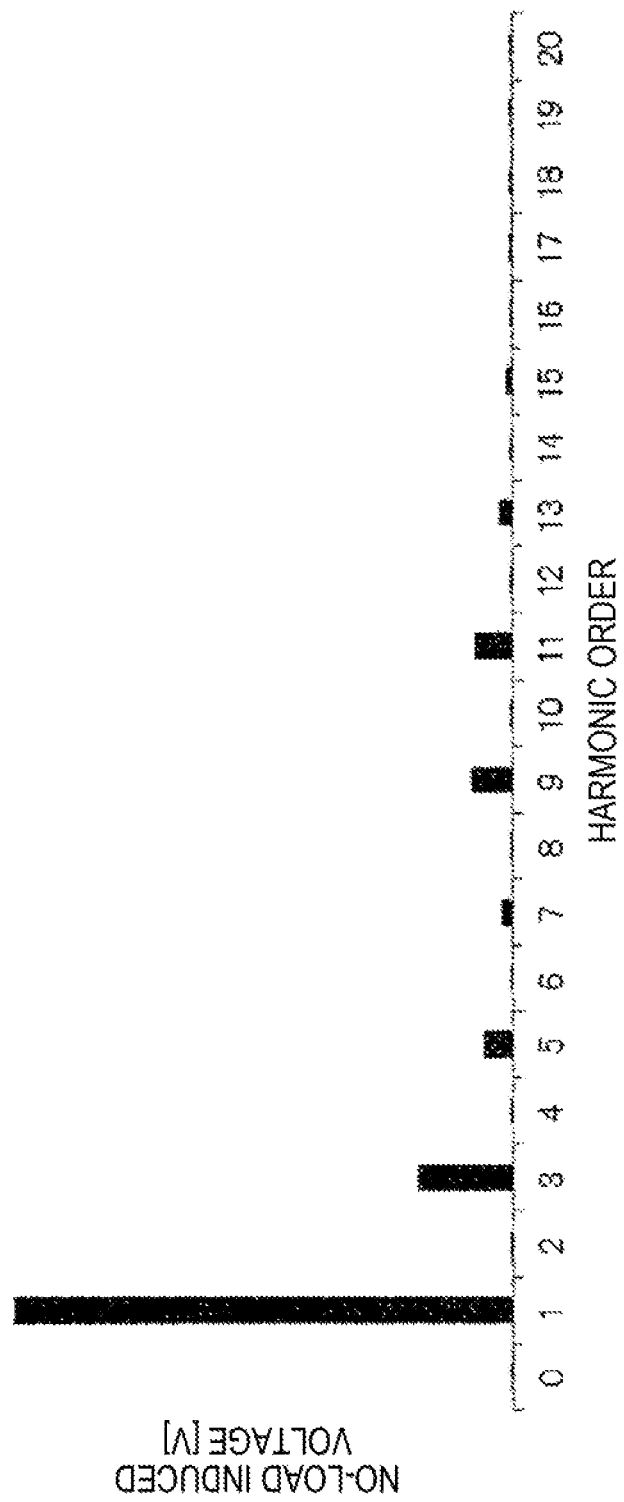

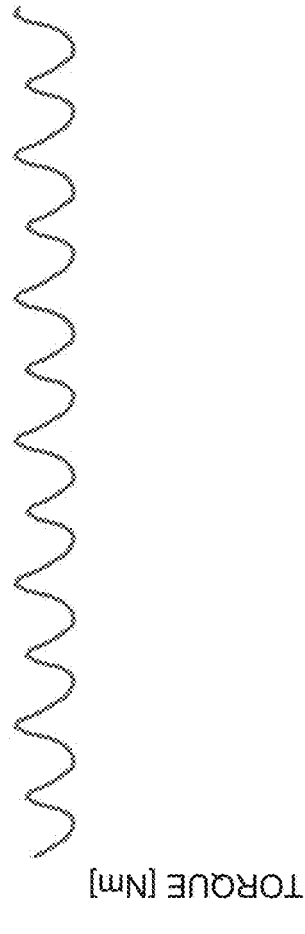
FIG. 15A  CASE OF SINUSOIDAL CURRENT
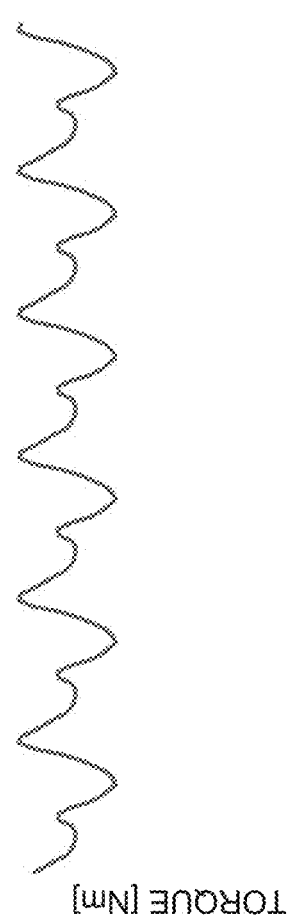
FIG. 15B  CASE OF DISTORTION WAVE CURRENT

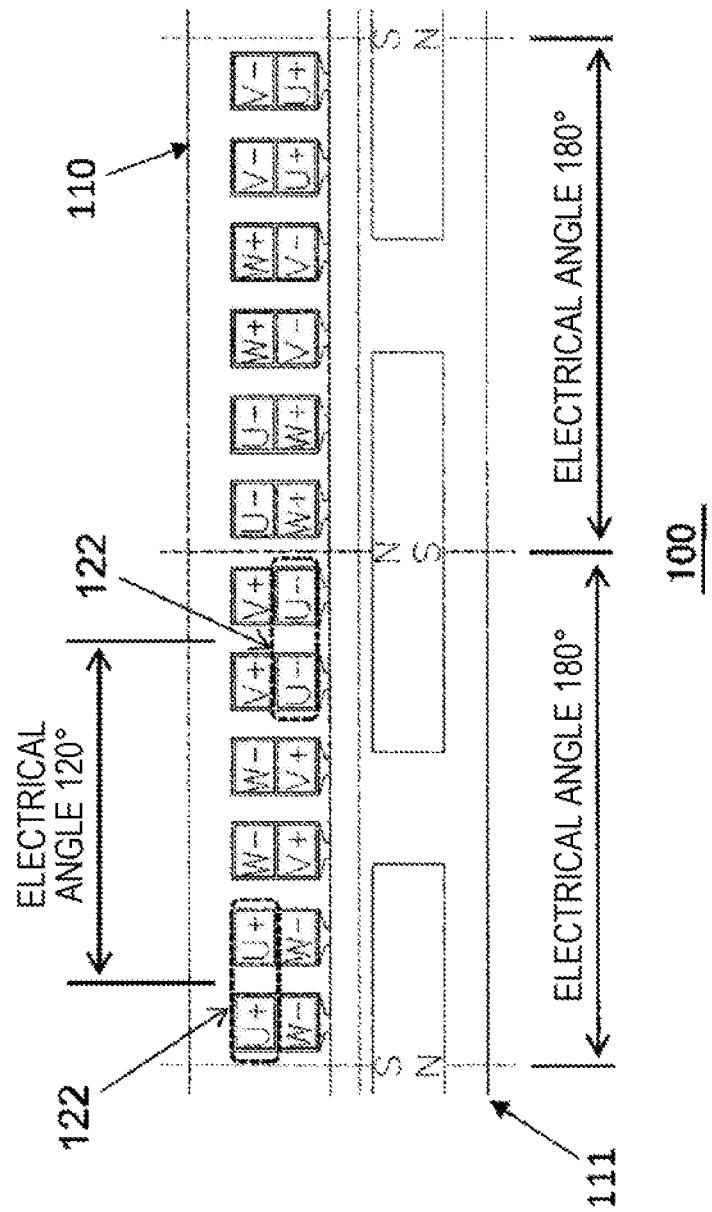

CASE OF SINUSOIDAL CURRENT

CASE OF DISTORTION WAVE CURRENT

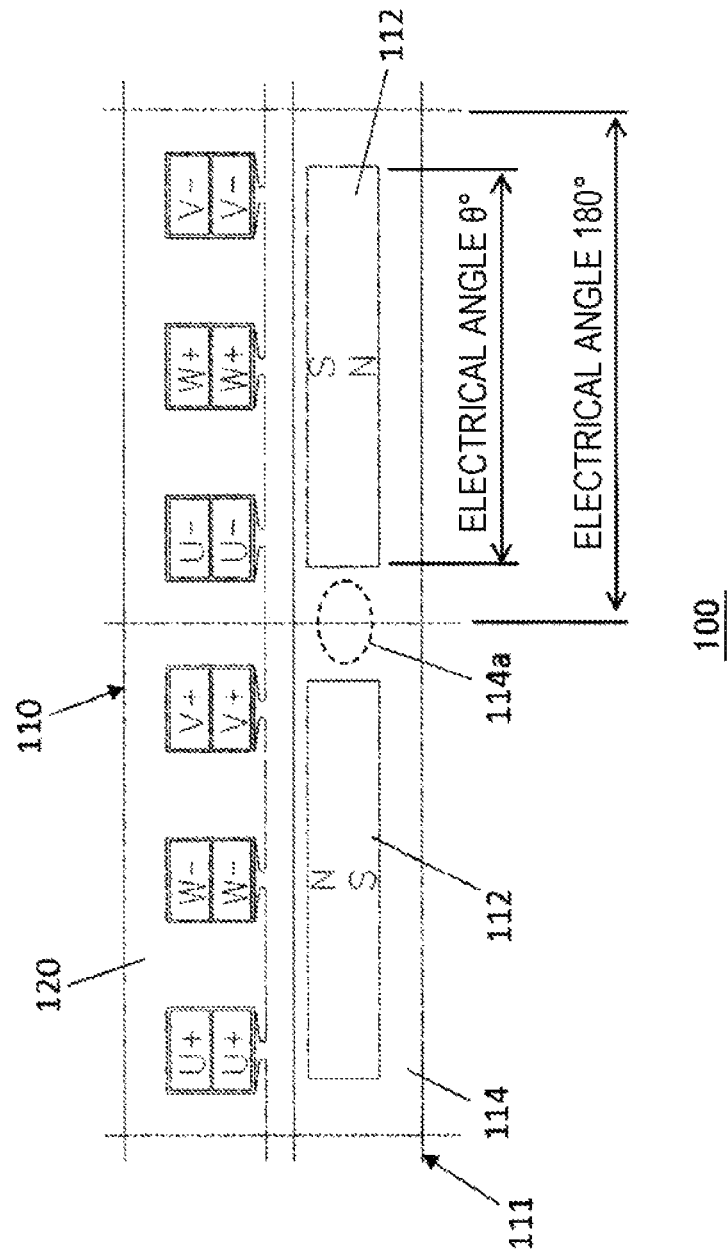

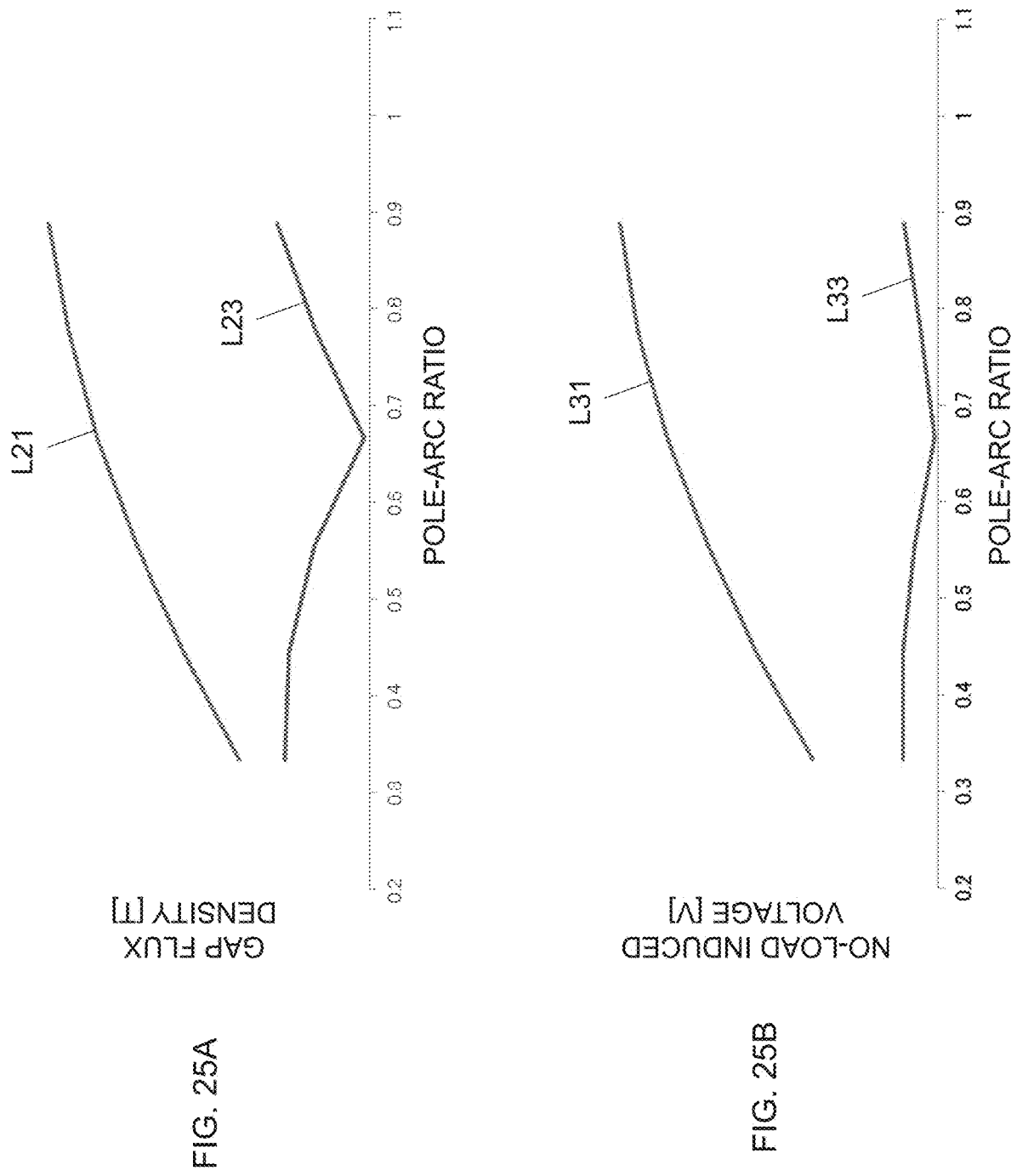

SIX-WIRE THREE-PHASE MOTOR, INVERTER DEVICE, AND MOTOR SYSTEM

TECHNICAL FIELD

The present invention relates to a six-wire three-phase motor, an inverter device, and a motor system.

BACKGROUND ART

Conventionally, a six-wire three-phase motor that can independently control current flowing in an armature winding wire in each phase has been known other than a general three-wire three-phase motor (see, for example, PTL 1).

Incidentally, increasing an input voltage is general as a method of realizing an increase in an output of a motor. However, a supply voltage of a motor for an automobile is determined by capacity of a battery and an applied voltage cannot be easily increased. Specifically, this is a bottleneck in an increase in an output in a system with a low battery voltage. Thus, in a conventional three-wire three-phase motor, a method of improving a voltage utilization rate by overmodulation control using PWM or a square wave, on which a third harmonic is superimposed, as a phase voltage command value is used as a method of increasing an applied voltage.

CITATION LIST

Patent Literature

PTL 1: JP 2000-125411 A

SUMMARY OF INVENTION

Technical Problem

Incidentally, since voltage is applied between phases in a normal three-wire three-phase motor, a third harmonic current does not flow even when overmodulation control is performed. However, since voltage is independently applied to each phase in a six-wire three-phase motor, a problem that a third harmonic current flows in the motor by overmodulation control and a torque ripple, vibration, and noise are deteriorated is generated.

Solution to Problem

According to a first aspect of the present invention, a six-wire three-phase motor is a six-wire three-phase motor including: a stator including a winding wire wound independently between phases; and a rotor including a plurality of magnets in a circumferential direction, wherein the stator or the rotor is configured in such a manner that a third harmonic current component in a motor current of when an overmodulation voltage based on a PWM signal is applied becomes higher than a third harmonic current component in a motor current of when a sinusoidal modulation voltage based on the PWM signal is applied. According to a second aspect of the present invention, an inverter device is an inverter device that applies an inverter applied voltage by PWM control based on a carrier wave and a signal wave to a six-wire three-phase motor, wherein the signal wave includes a fundamental wave having amplitude higher than amplitude of the carrier wave and a third harmonic signal and has amplitude equal to or lower than the amplitude of the carrier wave. According to a third aspect of the present invention, a motor system is a motor system including: a six-wire three-phase motor; and an inverter device that applies an inverter applied voltage by PWM control based on a carrier wave and a signal wave to the six-wire three-phase motor, wherein the signal wave includes a fundamental wave having amplitude higher than amplitude of the carrier wave and a third harmonic signal and has amplitude equal to or lower than the amplitude of the carrier wave.

Advantageous Effects of Invention

According to the present invention, it is possible to provide a six-wire three-phase motor that can realize both of increasing an output and reducing a torque ripple.

BRIEF DESCRIPTION OF DRAWINGS

FIG. 11 is a view illustrating a conventional example in a case where the number of slots per pole per phase is 2.

FIG. 12 is a graph for describing induced voltages Eu, Ev, and Ew in a case of a stator structure illustrated in FIG. 11.

FIG. 13 is a graph illustrating a component in each order in an induced voltage.

FIGS. 15A and 15B are graphs illustrating a torque waveform in a case where the sinusoidal current and the distortion wave current illustrated in FIG. 14 flow in a motor.

FIG. 18 is a view illustrating an embodiment in a case where the number of slots per pole per phase is 2.

FIG. 23 is a view for describing a rotor structure in a second embodiment.

FIGS. 25A and 25B are graphs illustrating pole-arc ratio dependence of first and third components in a magnetic flux density distribution, and pole-arc ratio dependence of first and third components in an induced voltage.

DESCRIPTION OF EMBODIMENTS

In the following, embodiments of the present invention will be described with reference to the drawings.

First Embodiment

Figure 1:
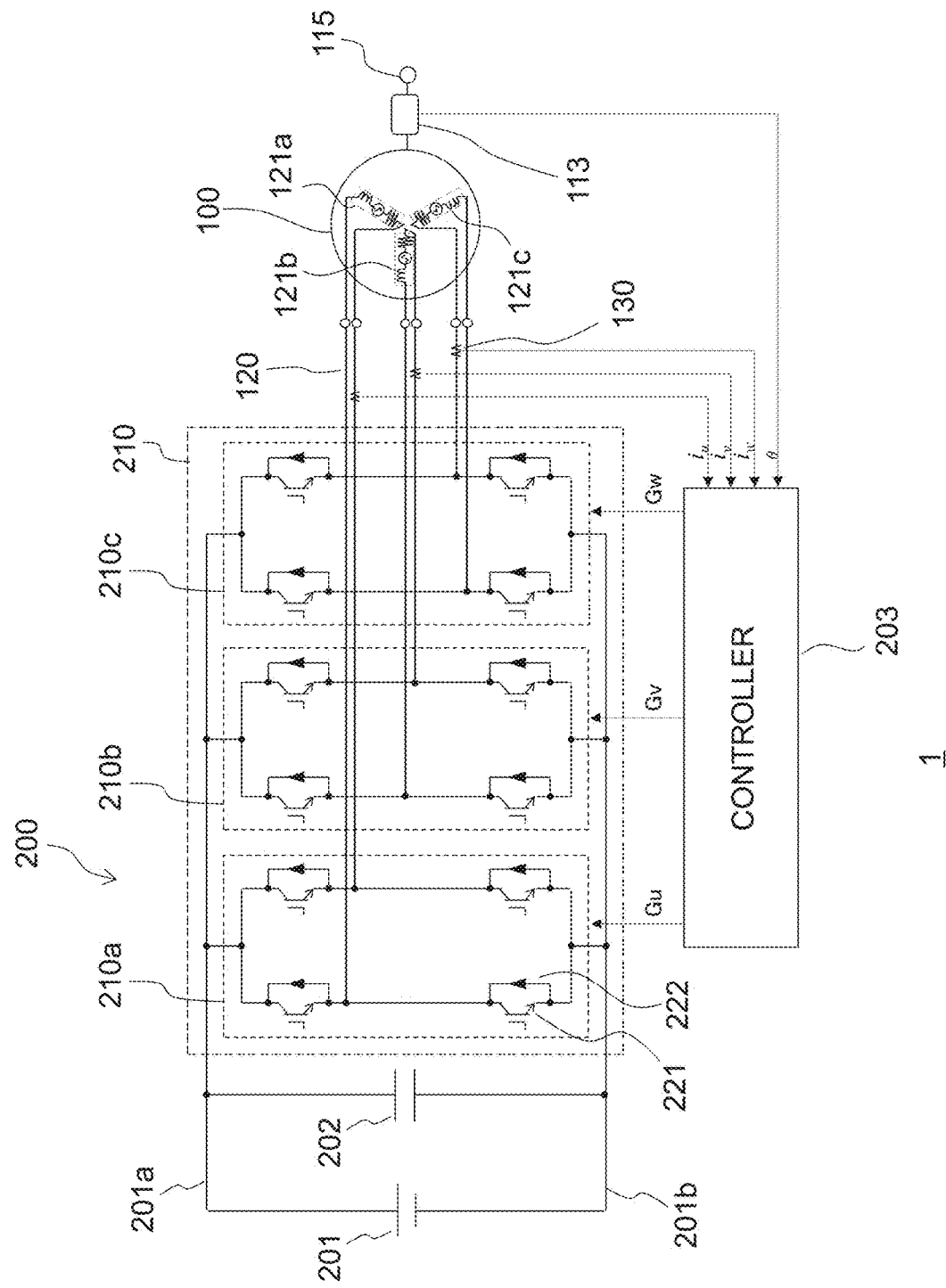
FIG. 1 is a view illustrating an example of a motor system in a first embodiment.

FIG. 1 is a view illustrating a schematic configuration of a motor system 1 to drive a six-wire three-phase motor. The motor system 1 includes an inverter device 200, and a motor 100 driven by the inverter device 200. Note that a DC power supply 201 may be included or may not be included in the motor system 1.

The inverter device 200 can drive the motor 100 by independently controlling current flowing in armature winding wires 121a to 121c. A magnetic pole position detector 115 to detect a magnetic pole position θ of the motor 100 is attached to an output shaft 113 of the motor 100. A result of the detection of the magnetic pole position θ by the magnetic pole position detector 115 is output to a controller 203.

The DC power supply 201 supplies DC power to an inverter circuit 210 through DC buses 201a and 201b. For example, a secondary battery such as a lithium-ion battery can be used as the DC power supply 201. A smoothing capacitor 202 is to control a variation in a DC voltage, which variation is caused along with an operation of the inverter circuit 210, and is connected in parallel with the inverter circuit 210 between the DC bus 201a and the DC bus 201b.

The inverter circuit 210 includes full-bridge bridge circuits 210a, 210b, and 210c respectively corresponding to a U phase, a V phase, and a W phase. The controller 203 respectively outputs drive signals Gu, Gv, and Gw to the bridge circuits 210a, 210b, and 210c of the inverter circuit 210 and controls the inverter circuit 210 by respectively operating the bridge circuits 210a, 210b, and 210c.

Each of the bridge circuits 210a, 210b, and 210c includes four IGBTs 221 that function as switching elements of upper and lower arms, and four diodes 222 provided in parallel with the IGBTs 221. In the bridge circuits 210a, 210b, and 210c, each of the IGBTs 221 performs a switching operation according to the drive signals Gu, Gv, and Gw from the controller 203. Accordingly, the DC power supplied from the DC power supply 201 is converted into three-phase AC power and is output from the bridge circuits 210a, 210b, and 210c respectively to the armature winding wires 121a, 121b, and 121c in phases of the motor 100 through AC output lines 120 in the phases. Currents iu, iv, and iw flowing in the AC output lines 120 are detected by a current sensor 130 and a detection result thereof is input into the controller 203.

Figure 2:
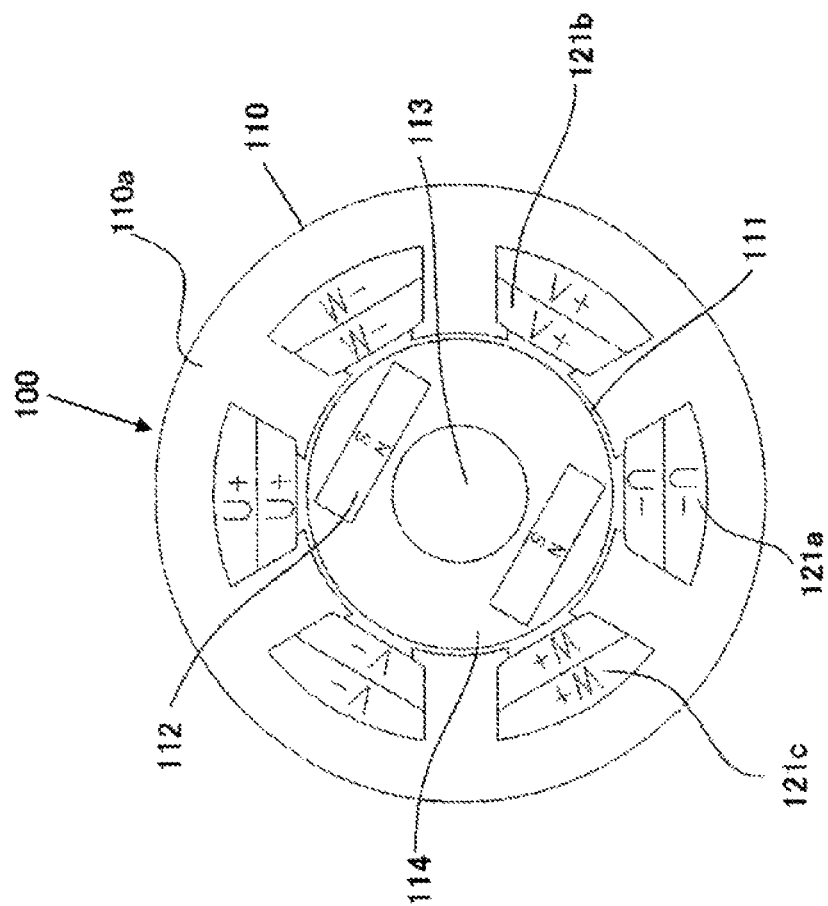
FIG. 2 is a sectional view illustrating a schematic configuration of a motor.

FIG. 2 is a view illustrating a configuration example of the motor 100 and illustrating a two-pole motor as an example. The motor 100 is a magnet-embedded motor. The armature winding wires 121a, 121b, and 121c are attached to a stator core 110a of a stator 110 with a phase difference of an electrical angle 120°. A rotor core 114 in an inner part of which a plurality of permanent magnets 112 is embedded is fixed to an output shaft 113 of a rotor 111.

As illustrated in FIG. 1, the motor 100 is a six-wire three-phase motor. In the present embodiment, sinusoidal modulation is performed when a motor output is low and a load is light, and a third harmonic is superimposed on a PWM signal wave and an applied voltage is increased when a motor output is high and a load is heavy.

Figure 3A:
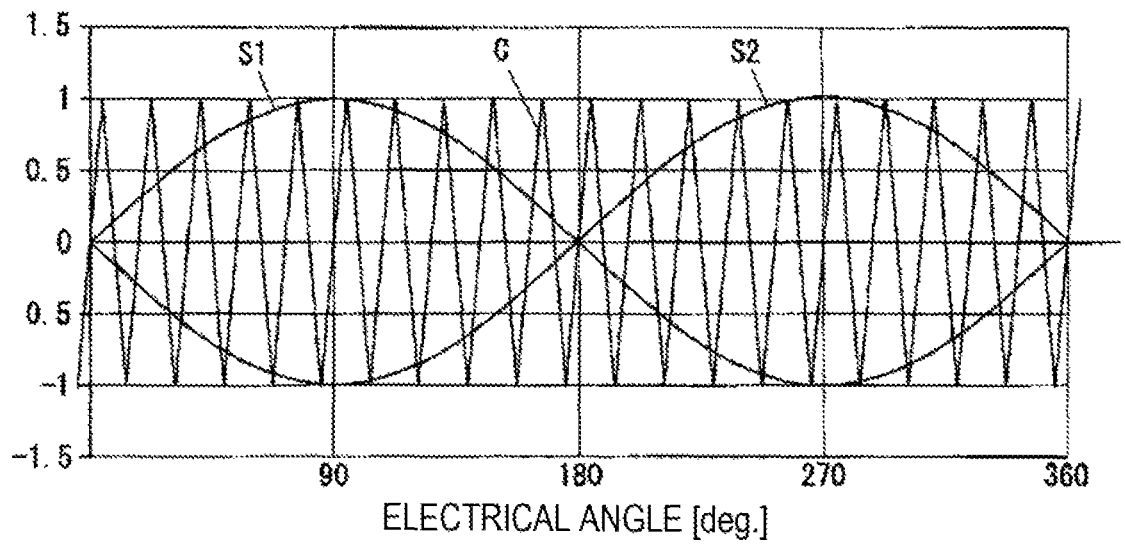
FIGS. 3A and 3B are graphs illustrating a generation method of a PWM pulse.
Figure 3B:
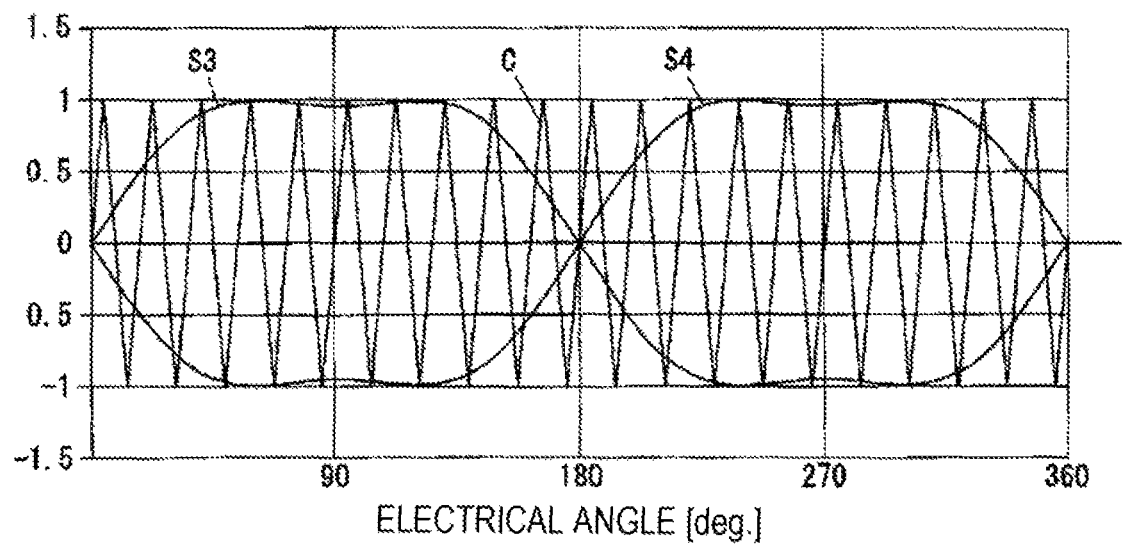

FIG. 3 is a graph illustrating a generation method of a PWM pulse. In a case of sinusoidal modulation illustrated in FIG. 3(a), signal waves S1 and S2 are applied to a carrier wave C and a PWM pulse is generated. On the other hand, in a case of overmodulation control illustrated in FIG. 3(b), signal waves S3 and S4 including a third harmonic component are applied and a PWM pulse is generated. Note that in FIG. 3, one phase is illustrated and a signal wave in each phase is what has a phase deviated for 120°.

In overmodulation control, amplitude of a fundamental wave (sinusoidal component) is higher than amplitude of a carrier wave and is set in such a manner that a modulation rate >1. Thus, an output becomes higher than that in a case of the sinusoidal modulation illustrated in FIG. 3(a). However, in the overmodulation control with a modulation rate >1, a third harmonic component is included in such a manner that amplitude of the signal waves S3 and S4 becomes lower than the amplitude of the carrier wave. As a result, a signal wave that has amplitude equal to or lower than the amplitude of the carrier wave and that is illustrated in FIG. 3(b) can be generated.

Figure 4A:
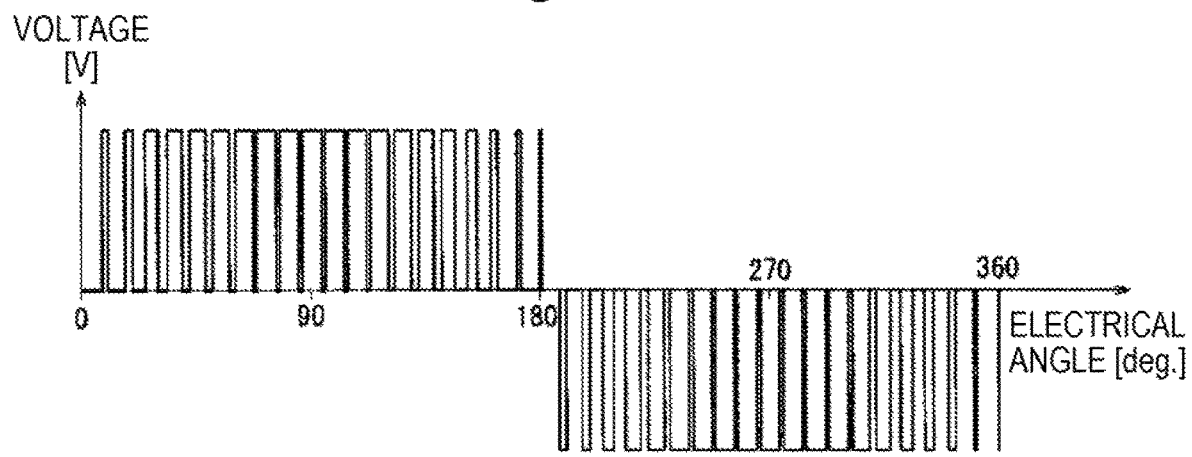
FIGS. 4A and 4B are graphs illustrating an inverter applied voltage waveform of a case where sinusoidal modulation and overmodulation control are performed.
Figure 4B:
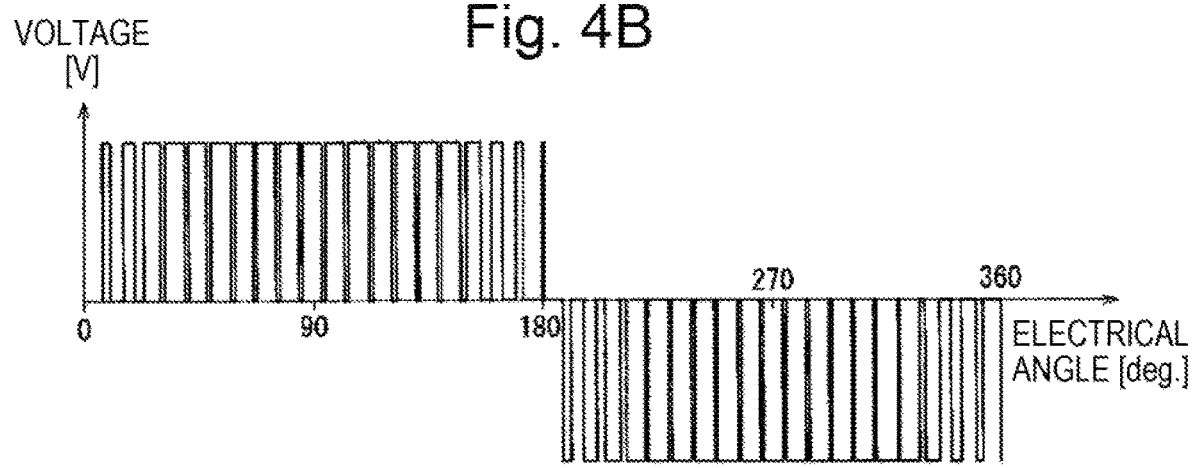

FIG. 4 is a graph illustrating an inverter applied voltage waveform of a case where the sinusoidal modulation and the overmodulation control in FIG. 3 are performed. In FIG. 4(a), a case of sinusoidal modulation with a modulation rate being equal to or lower than 1 is illustrated. In FIG. 4(b), a case of overmodulation control in which a third harmonic is superimposed to make a modulation rate equal to or higher than 1 is illustrated. Although the modulation rate is equal to or higher than 1 in the overmodulation control, it is possible to output voltage without making a switching element being constantly on by superimposing a third harmonic and controlling a maximum value of a signal wave as illustrated in FIG. 3(b).

Figure 5A:
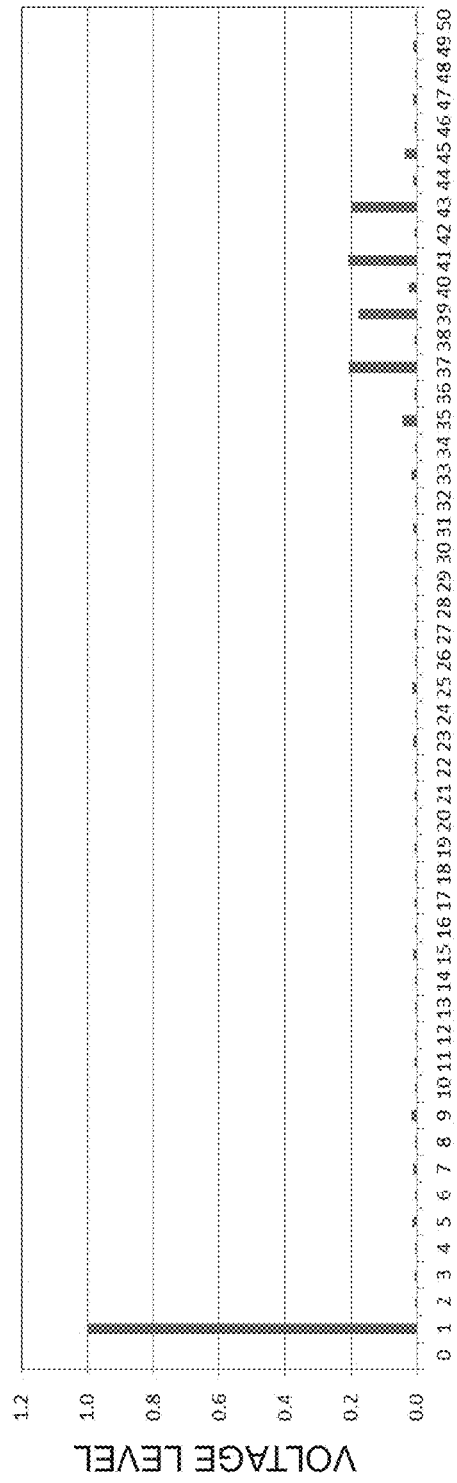
FIGS. 5A and 5B are graphs illustrating a component in each order included in an inverter applied voltage.
Figure 5B:
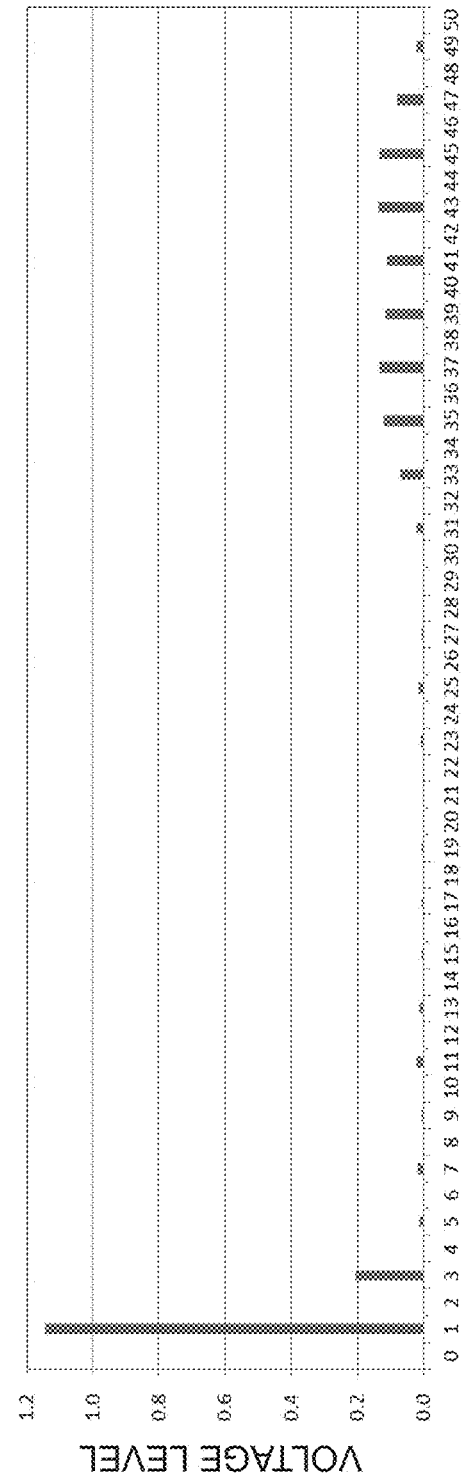

In FIG. 5, an analysis result of a component included in an inverter applied voltage illustrated in FIG. 4 is illustrated. A case of sinusoidal modulation is illustrated in FIG. 5(a) and a case of overmodulation is illustrated in FIG. 5(b). In a case of the sinusoidal modulation illustrated in FIG. 3(a), amplitude of the carrier wave C and amplitude of the signal wave S1 and S2 are the same. Thus, amplitude of a fundamental wave (first) component of voltage becomes the same with that of a DC voltage.

On the other hand, in a case of the overmodulation control using the signal waves S3 and S4 on which a third harmonic is superimposed, it is understood that a third harmonic is included in a voltage component. In such a manner, it becomes possible to make a fundamental wave (first order) equal to or higher than 1 without making amplitude of a signal wave higher than amplitude of a carrier wave by including a third harmonic into the signal wave, whereby it becomes to increase an applied voltage of an inverter and to increase an output of a motor.

Current flowing in a motor is determined on the basis of a voltage equation expressed by the following equation (1). The equation (1) expresses a U-phase equivalent circuit illustrated in FIG. 6. Similar equations can be established with respect to a V phase and a W phase. Vu is an inverter applied voltage, Iu is current flowing in a motor, R is coil resistance of the motor, L is inductance of the motor, and Eu is an induced voltage by a magnetic flux of the permanent magnets 112 provided in the rotor 111.

[Math 1]

$$V_u = RI_u + L\frac{dI_u}{dt} + E_u \quad (1)$$

Figure 6:
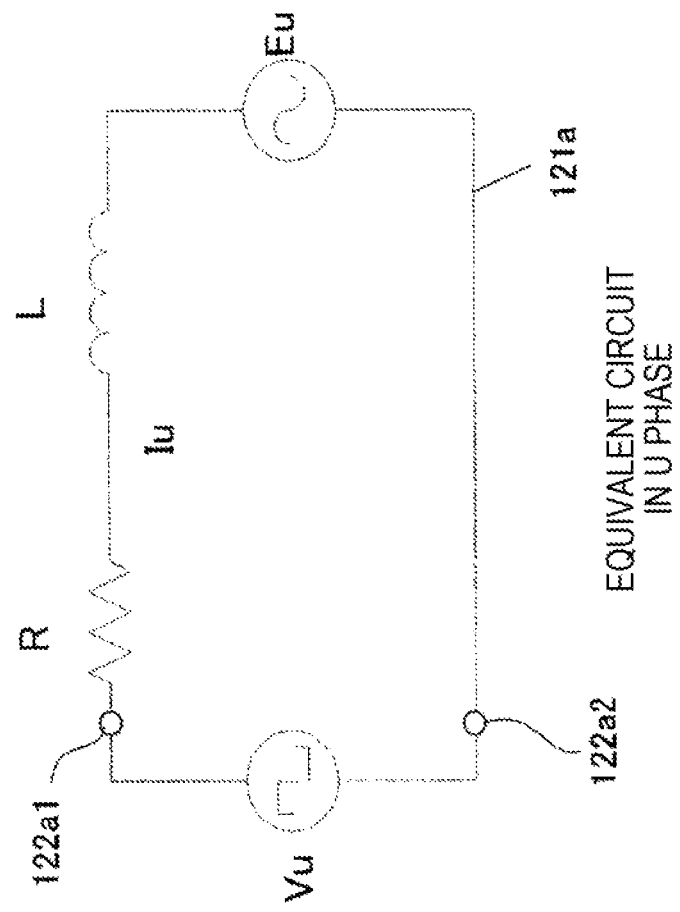
FIG. 6 is a view illustrating an equivalent circuit related to a U phase.

In FIG. 6, an equivalent circuit of a case where a U-phase bridge circuit 210a and a motor U-phase armature winding wire 121a are connected at U-phase winding wire ends 122a1 and 122a2 is illustrated. As it is understood from the equation (1), in a case where a third harmonic component is included in at least one of the inverter applied voltage Vu and the induced voltage Eu, a third harmonic is also included in the motor current Iu. Thus, when an inverter applied voltage including a third harmonic is applied as illustrated in FIGS. 4(b) and 5(b), a third harmonic is included in the current Iu flowing in the motor.

Figure 7:
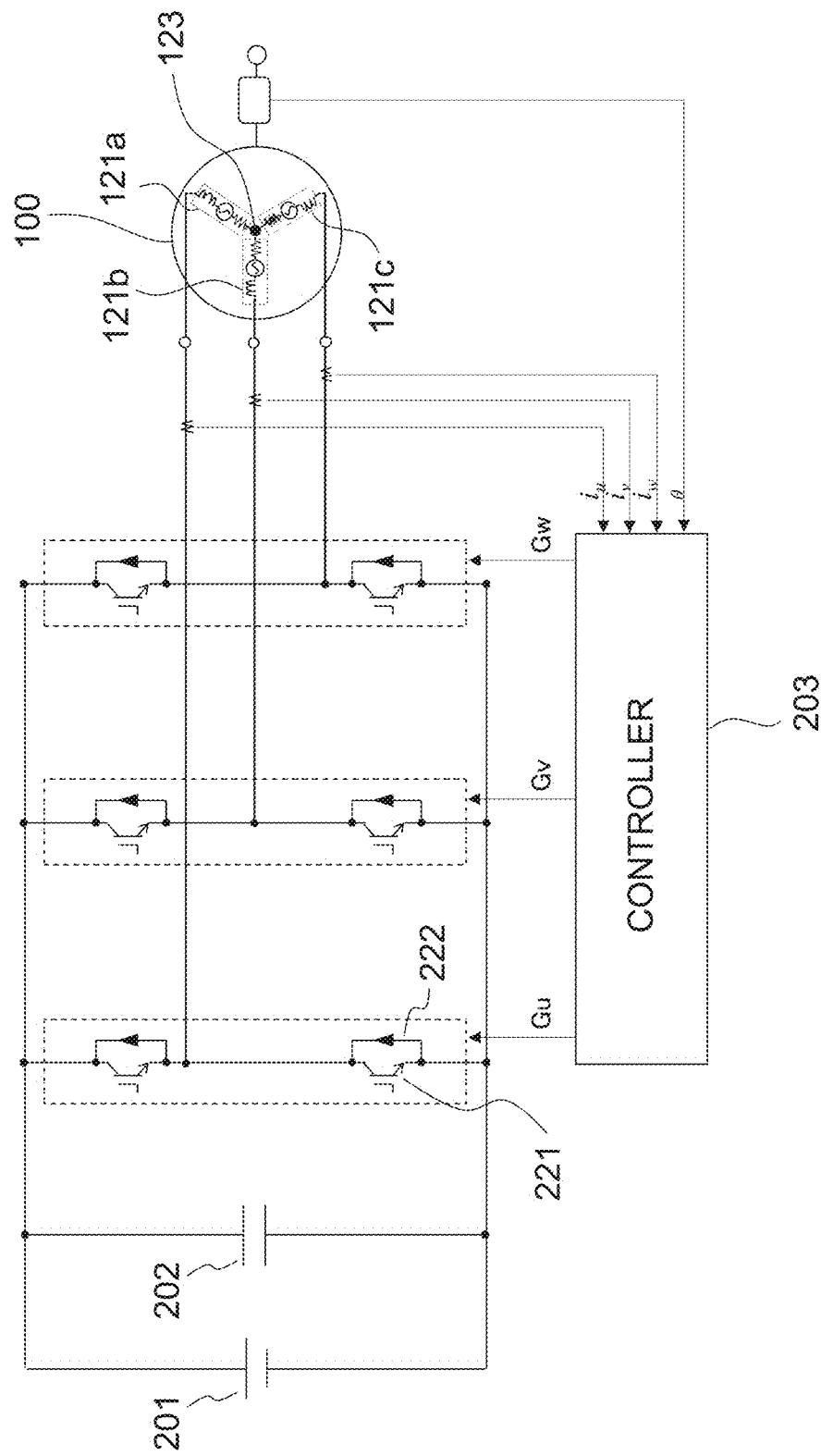
FIG. 7 is a view illustrating a motor system of a three-wire three-phase motor.

In a case of a normal three-wire three-phase motor, as illustrated in FIG. 7, star connection in which an end of each of armature winding wires 121a, 121b, and 121c in phases is short-circuited as a neutral point 123 is usually used and a third harmonic current does not flow in the motor 100.

However, since each of the armature winding wires 121a, 121b, and 121c in the phases is independent in the six-wire three-phase motor as illustrated in FIG. 1, a third harmonic is included in currents Iu, Iv, and Iw flowing in the motor when a third harmonic is included in induced voltages Eu, Ev, Ew or inverter applied voltages Vu, Vv, and Vw as described above.

Incidentally, power converted into a machine output by the motor 100 is expressed by instantaneous power in each phase. The induced voltages Eu, Ev, and Ew respectively generated in the phases of the motor 100 are expressed by the following equations (2) to (4). Note that the equations (2) to (4) includes up to a seventh harmonic.

[Math 2]

$$E_u = E_1 \sin(\omega t) + E_3 \sin(3\omega t) + E_5 \sin(5\omega t) + E_7 \sin(7\omega t) \quad (2)$$

$$E_v = E_1 \sin(\omega t - 120) + E_3 \sin\{3\times(\omega t - 120)\} + E_5 \sin\{5\times(\omega t - 120)\} + E_7 \sin\{7\times(\omega t - 120)\} \quad (3)$$

$$E_w = E_1 \sin(\omega t + 120) + E_3 \sin\{3\times(\omega t + 120)\} + E_5 \sin\{5\times(\omega t + 120)\} + E_7 \sin\{7\times(\omega t + 120)\} \quad (4)$$

In a case where the motor currents Iu, Iv, and Iw include a third harmonic due to an influence of the inverter applied voltage or the induced voltage, Iu, Iv, and Iw are expressed by the following equations (5) to (7).

[Math 3]

$$I_u = I_1 \sin(\omega t + \beta) + I_3 \sin\{3\times(\omega t + \beta)\} \quad (5)$$

$$I_v = I_1 \sin(\omega t - 120 + \beta) + I_3 \sin\{3\times(\omega t - 120 + \beta)\} \quad (6)$$

$$I_w = I_1 \sin(\omega t + 120 + \beta) + I_3 \sin\{3\times(\omega t + 120 + \beta)\} \quad (7)$$

Here, instantaneous power in the phases is expressed by the following equations (8) to (10), and power converted into a machine output by the motor 100 is expressed by the equation (11).

[Math 4]

$$P_u = I_u E_u = [I_1 \sin(\omega t + \beta) + I_3 \sin\{3\times(\omega t + \beta)\}] \times E_1 \sin(\omega t) + E_3 \sin\{(3\omega t) + E_3 \sin(5\omega t) + E_7 \sin(7\omega t)\} \quad (8)$$

$$P_v = I_v E_v = [I_1 \sin(\omega t - 120 + \beta) + I_3 \sin\{3\times(\omega t - 120 + \beta)\}] \times [E_1 \sin(\omega t - 120) + E_3 \sin\{3\times(\omega t - 120)\} + E_5 \sin\{5\times(\omega t - 120)\} + E_7 \sin\{7\times(\omega t - 120)\}] \quad (9)$$

$$P_w = I_w E_w = [I_1 \sin(\omega t - 120 + \beta) + I_3 \sin\{3\times(\omega t - 120 + \beta)\}] \times [E_1 \sin(\omega t - 120) + E_3 \sin\{3\times(\omega t - 120)\} + E_5 \sin\{5\times(\omega t - 120)\} + E_7 \sin\{7\times(\omega t - 120)\}] \quad (10)$$

$$P = P_u + P_v + P_w = I_u E_u + I_v E_v + I_w E_w \quad (11)$$

When the equations (5) to (10) are substituted into the equation (11) and are expanded and arranged, the following equation (12) is acquired. Then, motor torque τ is expressed by an equation (13). In the equation (12) of the instantaneous power, terms including cos (δω+cos β), cos (δωt−β), and cos (δωt+3β) are terms indicating sextuple power pulsating. It is understood from the equation (13) that a torque ripple is generated due to this pulsating component. Three items in { } of the equations (12) and (13) are sextuple pulsating components by a fifth harmonic induced voltage E5 and a fundamental wave current I1, four items are sextuple pulsating components by a seventh harmonic induced voltage E7 and the fundamental wave current I1, and five components are sextuple pulsating components by a third harmonic induced voltage $E_3$ and a third harmonic current $I_3$. In these five items, a torque ripple is increased when a third harmonic is included in each of the induced voltages Eu, Ev, and Ew and the current Iu, Iv, and Iw flowing in the motor.

[Math 5]

$$P = \frac{3}{2}\{I_1 E_1 \cos(\beta) + I_3 E_3 \cos(3\beta) + I_1 E_3 \cos(6\omega t + \beta) + I_1 E_2 \cos(6\omega t - \beta) + I_3 E_3 \cos(6\omega t + 3\beta)\} \quad (12)$$

$$\tau = \frac{P}{\omega}$$

$$= \frac{3}{2\omega}\{I_1 E_1 \cos(\beta) + I_3 E_3 \cos(3\beta) + I_1 E_3 \cos(6\omega t + \beta) + I_1 E_1 \cos(6\omega t - \beta) + I_3 E_3 \cos(6\omega t + 3\beta)\} \quad (13)$$

In the present embodiment, a torque ripple due to the third harmonic induced voltage $E_3$ is controlled with a configuration of a winding wire being a configuration described in the following. Incidentally, whether a harmonic component is included in the induced voltages Eu, Ev, and Ew depends on a magnetic flux density distribution formed in a gap by the permanent magnets 112.

Figure 8:
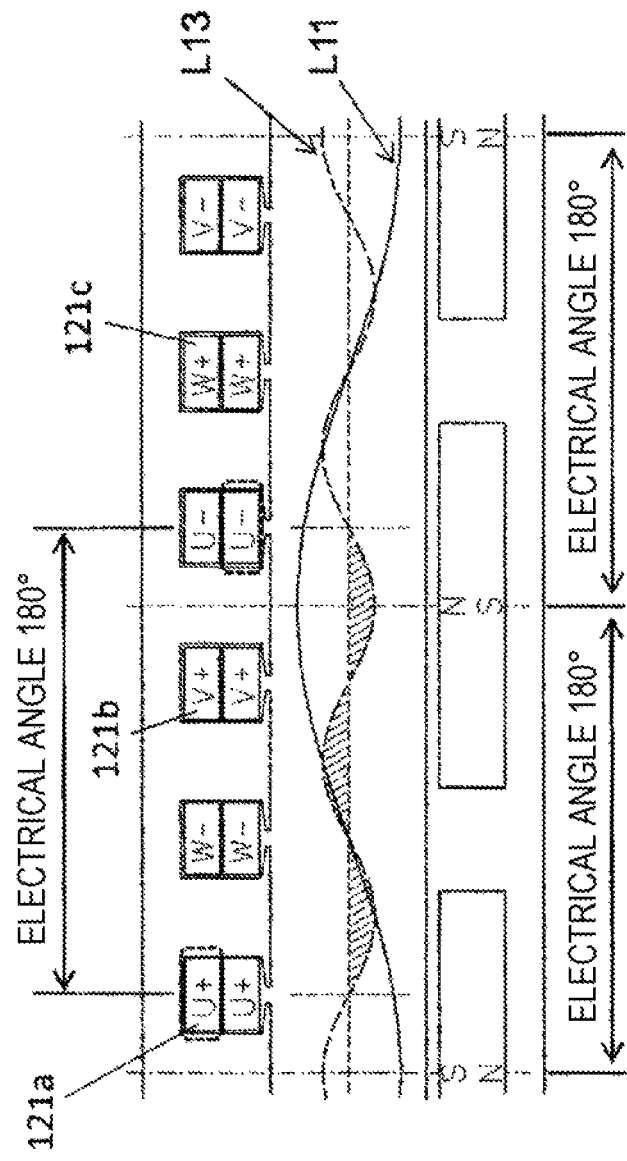
FIG. 8 is a view for describing generation of a third harmonic induced voltage $E_3$ (Eu3, Ev3, and Ew3).

FIG. 8 is a view for describing generation of a third harmonic induced voltage $E_3$ (Eu3, Ev3, and Ew3). In a configuration illustrated in FIG. 8, armature winding wires 121a, 121b, and 121c are wound by distributed winding at the same pitch with a magnetic pole pitch of a north pole and a south pole of the permanent magnet 112. A line L11 indicates a fundamental wave component of a magnetic flux density distribution, and one cycle thereof is 360° at an electrical angle. This fundamental wave component is a component converted into steady torque or a machine output of a motor. Also, a line L13 indicates a third harmonic component in the magnetic flux density distribution, and one cycle thereof is 120° at the electrical angle. In such a manner, the north pole and the south pole are lined up at equal intervals at a pitch of 180°. However, the magnetic flux density distribution is not sinusoidal but is distorted.

When a U-phase armature winding wire 121a in FIG. 8 is seen, a pitch (electrical angle 180°) of the U-phase armature winding wire 121a corresponds to 1.5 cycles of a third harmonic component. Induced voltage Eu is generated when a magnetic flux is interlinked with the U-phase armature winding wire 121a. Magnitude or a direction of the induced voltage Eu in the U-phase armature winding wire 121a varies depending on a phase of the interlinked magnetic flux.

For example, when a third harmonic component (line L13) in a range of an electrical angle 180° between a U-phase armature winding wire 121a indicated by a sign (U+) and a U-phase armature winding wire 121a indicated by a sign (U−) is seen, signs are opposite in magnetic flux density from a position of the sign (U+) to an electrical angle 60° and magnetic flux density from a position of the electrical angle 60° to a position of an electrical angle 120°. Thus, contribution of these parts to the induced voltage Eu is canceled. When a whole range of the electrical angle 180° is seen, a half cycle (minus part) remains as an interlinkage magnetic flux.

A plus part in a half cycle remains as an interlinkage magnetic flux when a rotor 111 is rotated for 60° (electrical angle) from the state in FIG. 8, and a state goes back to that in FIG. 8 with a further rotation for 60° (electrical angle). As a result, an induced voltage component in a cycle 120°, that is, the third harmonic induced voltage Eu3 is generated. This is a third harmonic component in an induced voltage due to a third harmonic component in a magnetic flux density distribution. The third harmonic induced voltages EV3 and Ew3 in a V phase and a W phase are in a similar manner.

To increase an output of a motor 100, it is effective to superimpose a third harmonic to an inverter applied voltage and to increase a fundamental wave voltage as illustrated in FIGS. 3 to 5. However, when a third current $I_3$ flows in the motor 100 by a third harmonic component in the inverter applied voltage, a torque ripple by the current $I_3$ and the third harmonic induced voltage $E_3$ due to magnetic flux density is increased as expressed by the equation (13).

Figure 9:
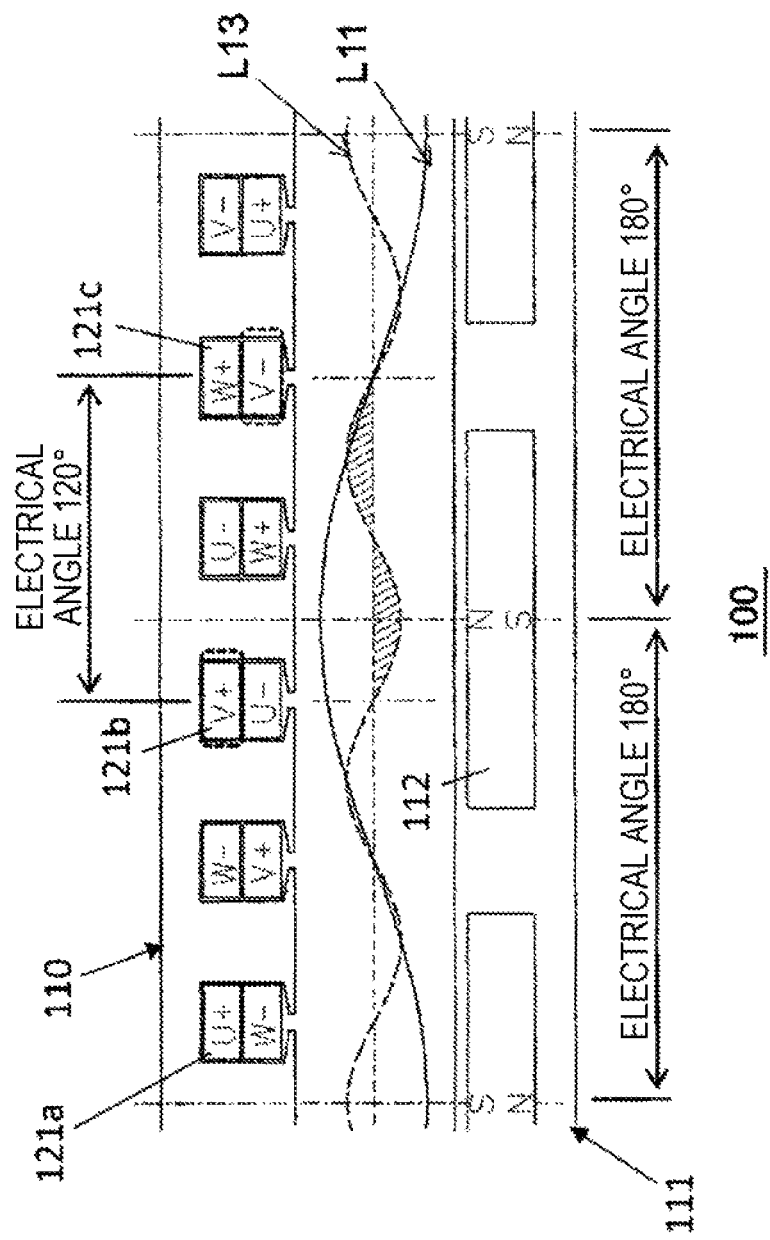
FIG. 9 is a view for describing a stator structure in the present embodiment.

FIG. 9 is a view for describing a stator structure in the present embodiment. With a winding wire configuration illustrated in FIG. 9, it is possible to control generation of a torque ripple due to a third harmonic voltage even in a case where the third harmonic voltage is superimposed on an inverter applied voltage and high-output driving is performed.

In the winding wire configuration illustrated in FIG. 9, winding is performed by ⅔ short pitch winding in which a pitch of armature winding wires 121a, 121b, and 121c is ⅔ of a magnetic pole pitch. In this configuration, a pitch of the winding wires is an electrical angle 120° and is set to be the same with one cycle of a third harmonic component in a magnetic flux density distribution. Thus, even when a rotor 111 is rotated, one cycle of a third harmonic component is constantly included in a range of the electrical angle 120°, and a plus part and a minus part constantly cancel each other.

That is, the armature winding wires 121a, 121b, and 121c in phases are wound in such a manner that a third harmonic component in the magnetic flux density distribution is not interlinked with the armature winding wires 121a, 121b, and 121c in the phases. Thus, $E_3$ in the equation (13) becomes $E_3=0$, and a sixth torque ripple is not generated even when a third harmonic voltage is superimposed on an inverter applied voltage and a third harmonic current $I_3$ flows in a motor 100.

Figure 10:
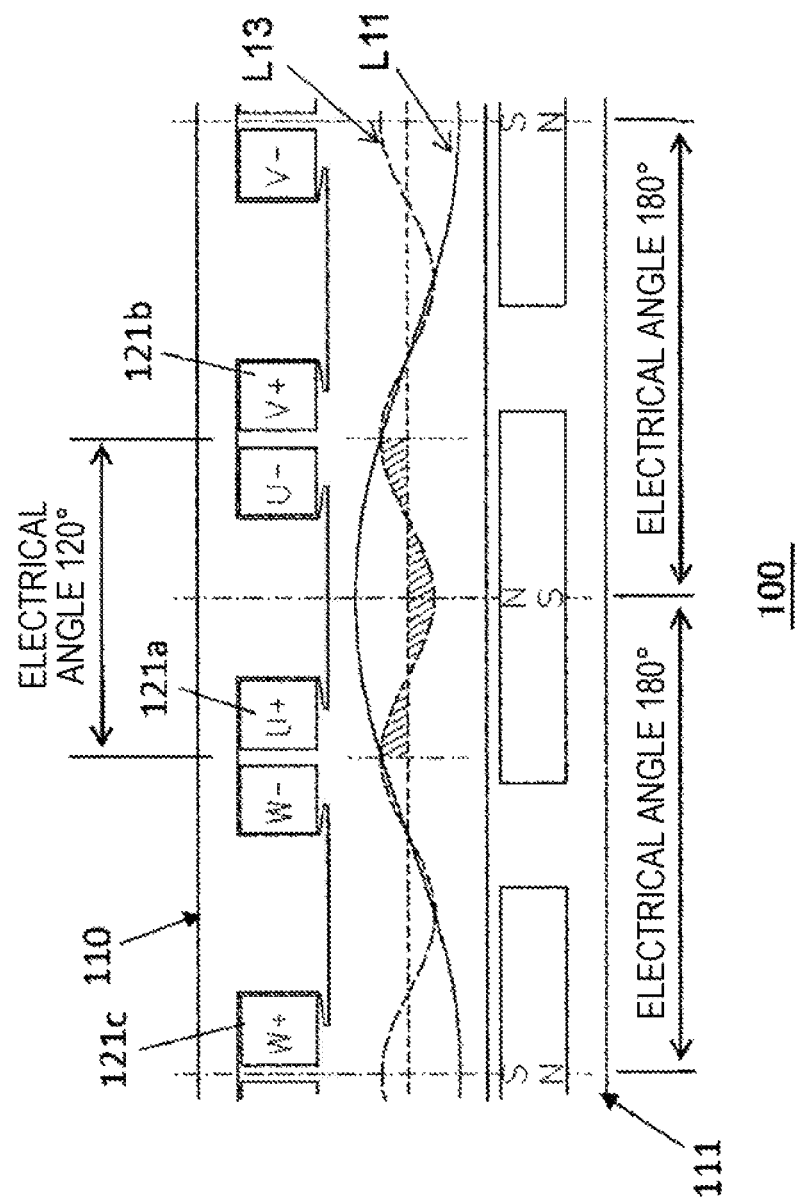
FIG. 10 is a view illustrating an application example in a case of a two-pole three-slot concentrated winding stator.

In FIG. 10, a case where the present invention is applied to a two-pole three-slot concentrated winding stator is illustrated. In the two-pole three-slot concentrated winding stator, armature winding wires 121a, 121b, and 121c in phases are arranged at intervals of an electrical angle 120° in one cycle of a magnetic pole (electrical angle 360°). When a hatched region in a line L13 indicating a third harmonic component in a magnetic flux density distribution is seen, it is understood that a plus part and a minus part cancel each other in a range of the electrical angle 120°. As a result, a term including $E_3$ in the equation (13) becomes zero. Thus, even when current of a third harmonic component flows in a motor 100, a torque ripple due to this is not generated.

(In a case where the number of slots per pole per phase is 2)

The present embodiment can be also applied to a case where the number of slots per pole per phase is equal to or larger than 2. FIG. 11 is a view of a case where the number of slots per pole per phase is 2 and illustrating a case where the present embodiment is not applied. A phase belt 122 of a U phase is arranged at an electrical angle 180 ° pitch. Phase belts of a V phase and a W phase are similar to a case of the U phase. An arrangement of the phase belt 122 is the same with an arrangement in a case of (U+) and (U−) in FIG. 8. From a reason similar to that in a case of FIG. 8, a third harmonic induced voltage due to a third harmonic component in a magnetic flux density distribution is generated.

As a result, induced voltages Eu, Ev, and Ew illustrated in FIG. 12 are respectively generated in coils in the phases. From FIG. 12, it is understood that the induced voltages Eu, Ev, and Ew are not sinusoidal. FIG. 13 is a graph illustrating a component in each order in an induced voltage. The induced voltage includes a low-order harmonic component including a third harmonic. In a case where currents Iu, Iv, and Iw illustrated in FIG. 14 flow in a motor 100 having a stator structure illustrated in FIG. 11, a torque waveform illustrated in FIG. 15 is indicated. FIG. 16 is a graph illustrating a component in a current waveform illustrated in FIG. 14.

Figure 14A:
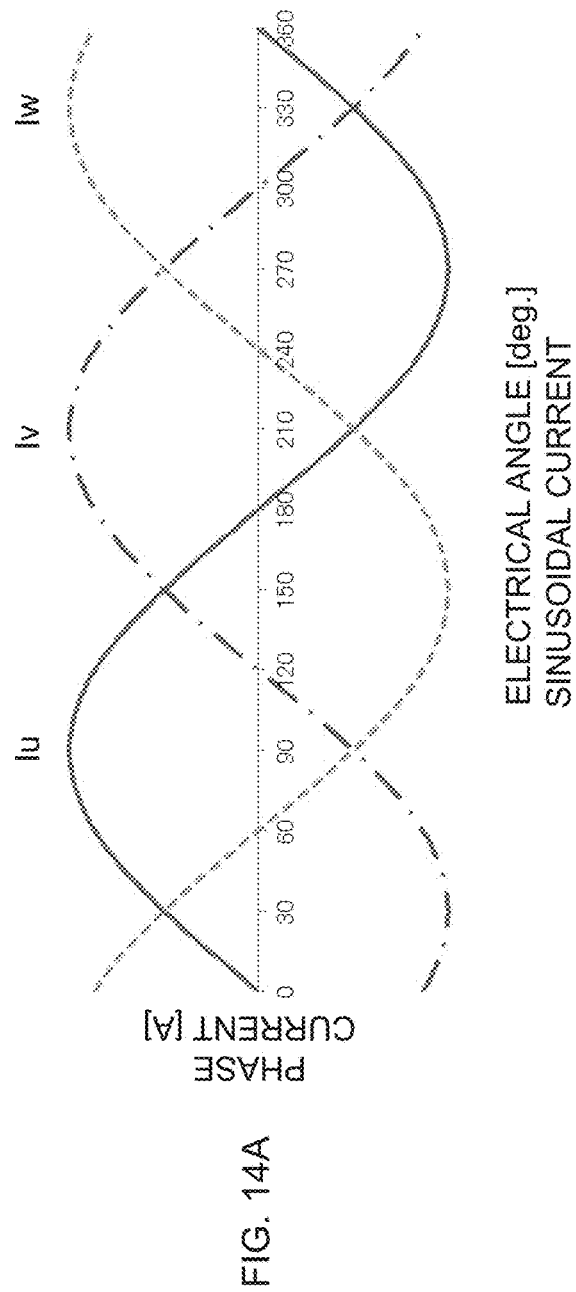
FIGS. 14A and 14B are graphs illustrating a sinusoidal current and a distortion wave current.
Figure 16A:
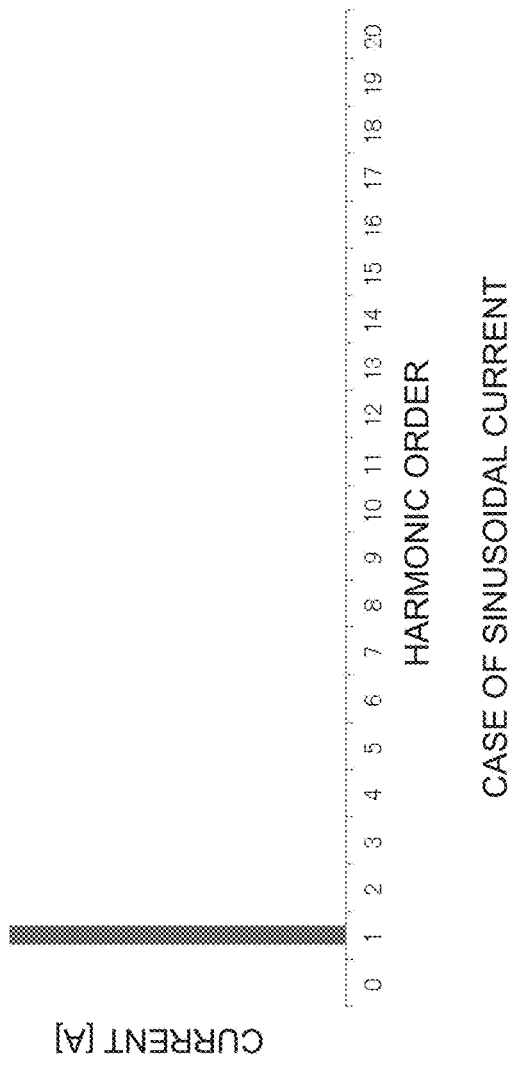
FIGS. 16A and 16B are graphs illustrating each order component included in a current waveform in FIG. 14.
Figure 16B:
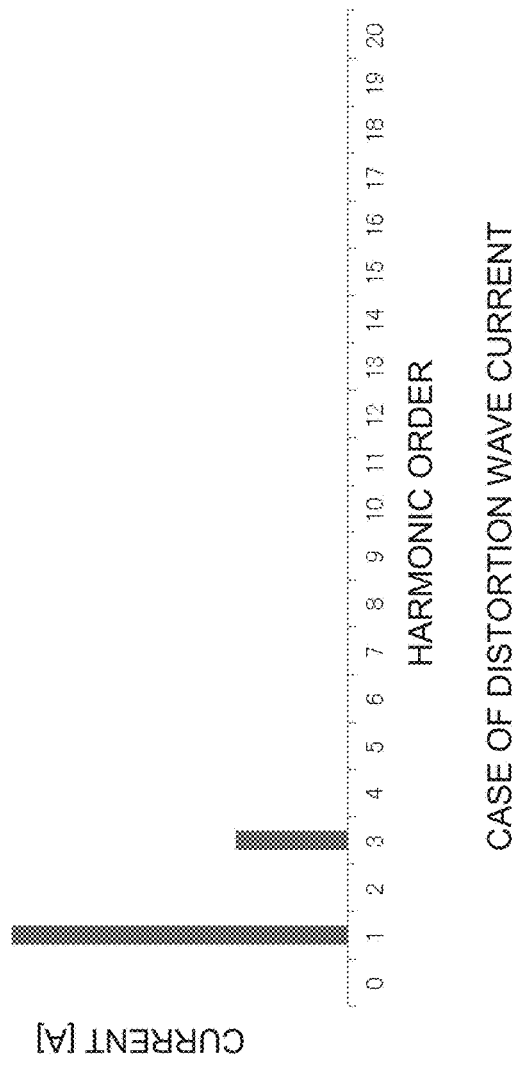

In FIG. 14(a), a case where currents Iu, Iv, and Iw are a sinusoidal current is illustrated. In this case, only a first fundamental wave component is included as illustrated in FIG. 16(a). On the other hand, currents Iu, Iv, and Iw illustrated in FIG. 14(b) indicate a case of a distortion wave current including a fundamental wave component and a third harmonic component. As illustrated in FIG. 16(b), a fundamental wave component and a third harmonic component are included. When torque waveforms in FIGS. 15(a) and (b) are seen, a torque ripple is higher in a case where the distortion wave current in FIG. 14(b) flows than in a case where the sinusoidal current in FIG. 14(a) flows.

Figures 17A, 17B:
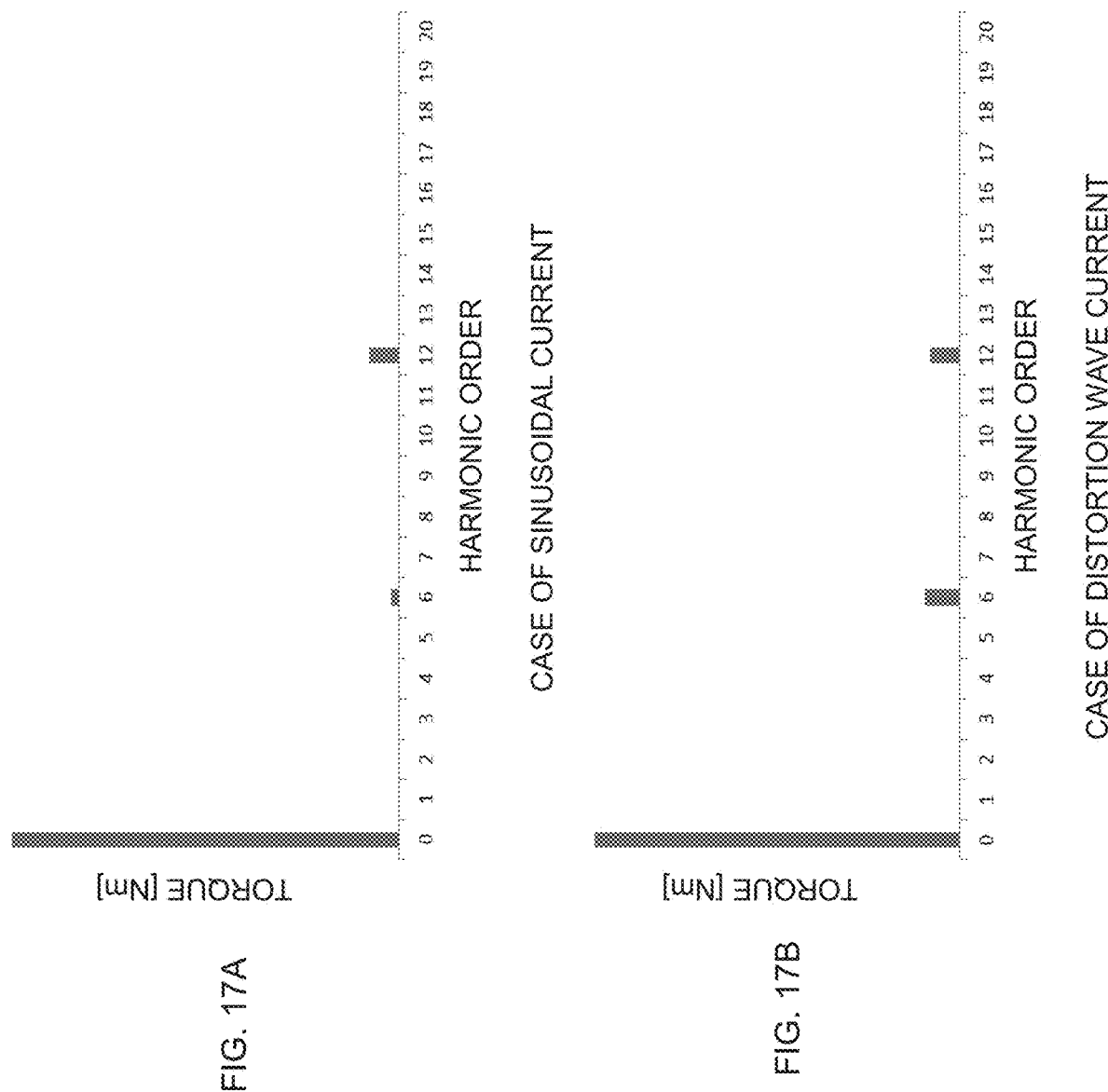
FIGS. 17A and 17B are graphs illustrating each order component included in the torque waveform in FIG. 15.

FIG. 17 is a graph illustrating a component included in the torque waveform in FIG. 15. A component in the torque waveform in FIG. 15(a) is illustrated in FIG. 17(a), and a component in the torque waveform in FIG. 15(b) is illustrated in FIG. 17(b). Average torque does not vary much in a case of FIG. 17(a) and a case of FIG. 17(b). It is understood that a torque ripple is higher in the case of FIG. 17(b) in which a distortion wave current including a third harmonic flows. That is, while a third term and a fourth term in { } in the equation (13) appear as a sixth component in a case where a sinusoidal current flows, a third term, a fourth term, and a fifth term in { } in the equation (13) appear as a sixth component in a case where a distortion wave current including a third harmonic flows. The torque ripple becomes higher in the case of FIG. 17(b) since the fifth term is included.

On the other hand, in a case where the number of slots per pole per phase is 2 in the present embodiment, a winding wire configuration illustrated in FIG. 18 is employed instead of the winding wire configuration in FIG. 11. That is, an arrangement of a phase belt 122 is similar to the arrangement illustrated in FIG. 9, and ⅔ short pitch winding in which a pitch of the phase belt 122 is an electrical angle 120° is employed. With such a winding wire configuration, a third harmonic induced voltage $E_3$ becomes zero and a fifth term including $E_3$ in the equation (13) becomes zero, whereby it is possible to reduce a sixth component in a torque ripple.

Figure 19:
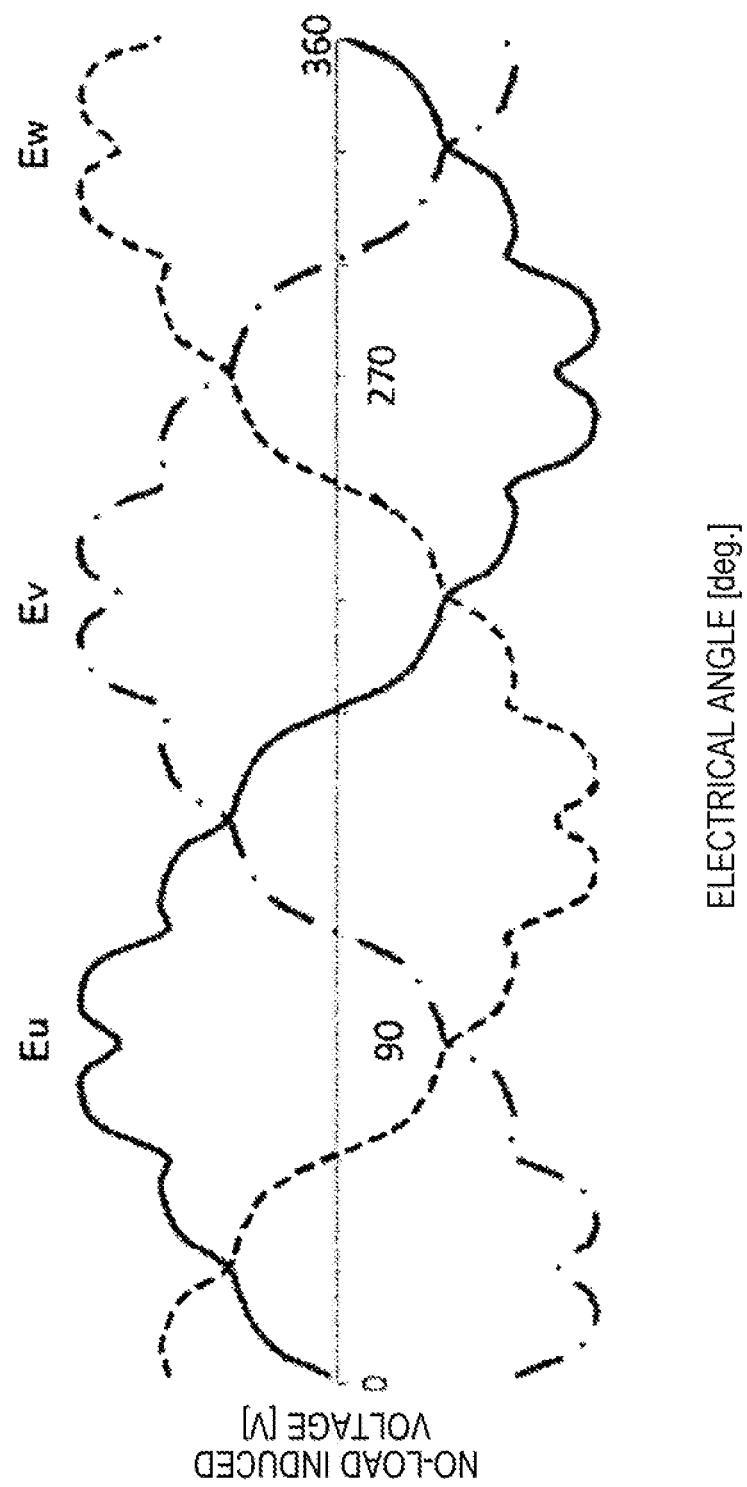
FIG. 19 is a graph illustrating an example of an induced voltage waveform generated in a coil in each phase in a case of a stator structure illustrated in FIG. 18.
Figure 20:
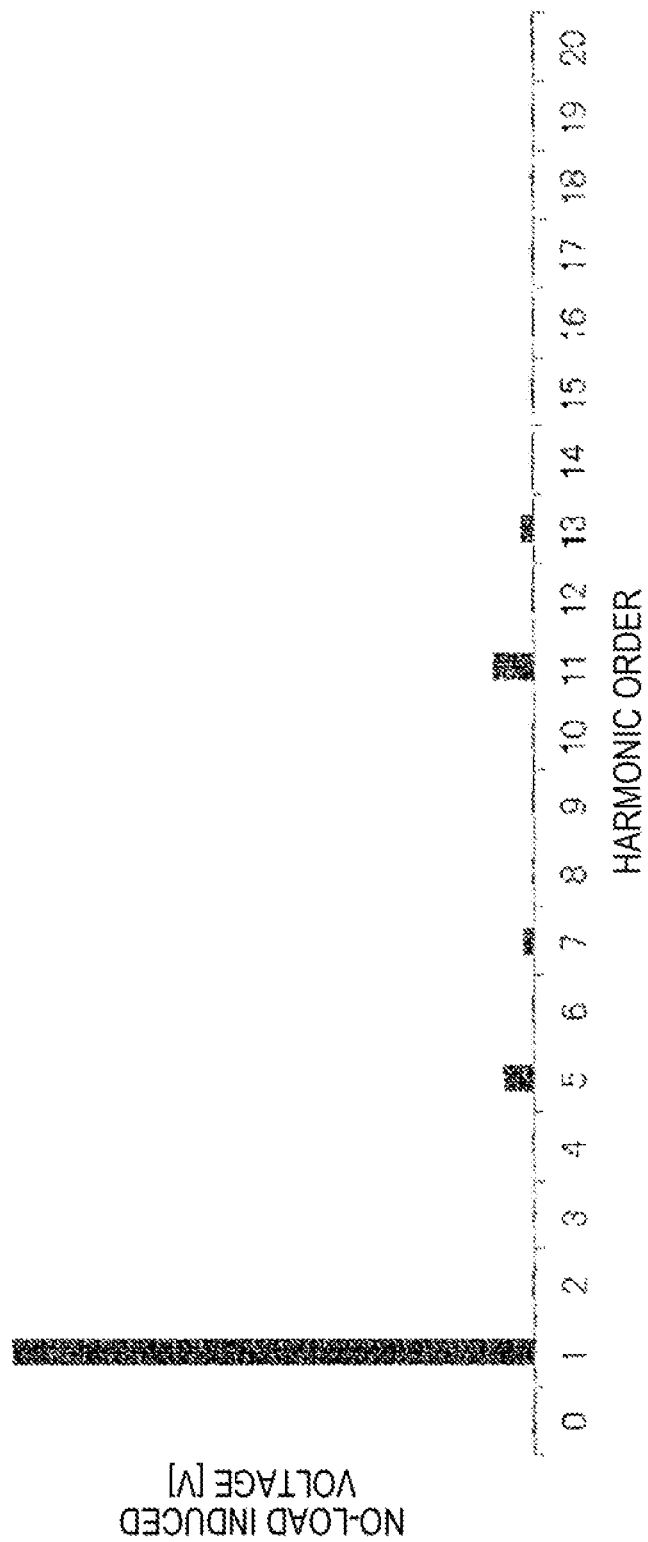
FIG. 20 is a graph illustrating each order component in the induced voltage waveform illustrated in FIG. 19.

FIG. 19 is a graph illustrating an example of an induced voltage waveform generated in an armature winding wire in each phase in a case of a stator structure illustrated in FIG. 18. It is understood that an induced voltage in each phase is not sinusoidal but a distorted wave. In FIG. 20, a component in each order in the induced voltage waveform illustrated in FIG. 19 is illustrated. It can be understood that a low-order harmonic component is included in the induced voltage waveform but no third harmonic component is included since a pitch of the phase belt 122 is set to the electrical angle 120°.

Figure 14B:
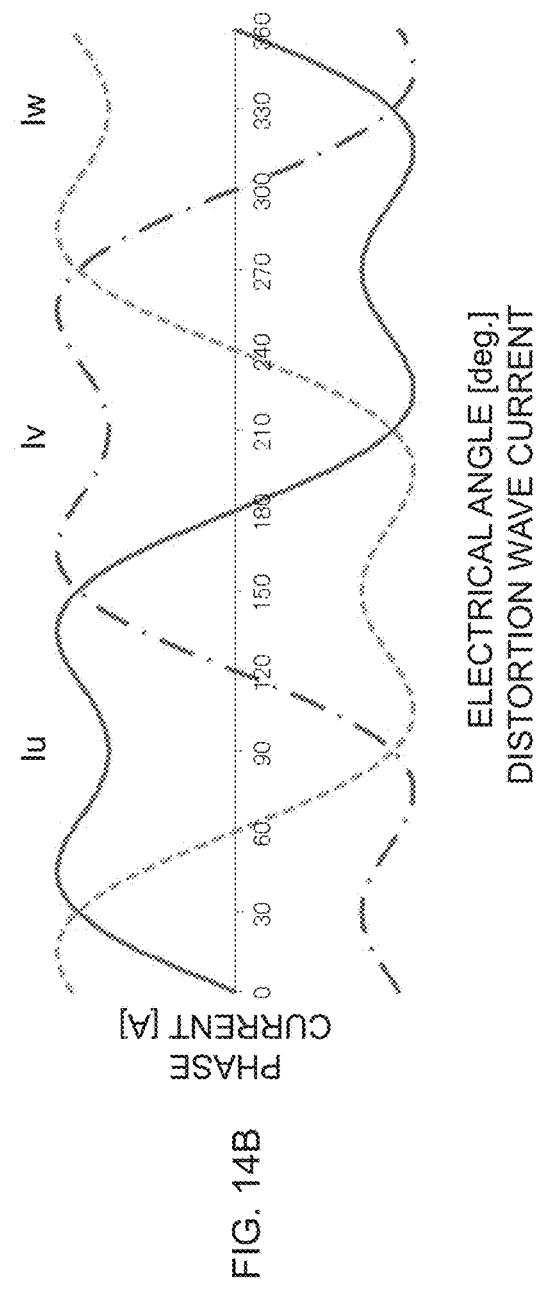
Figure 21A:
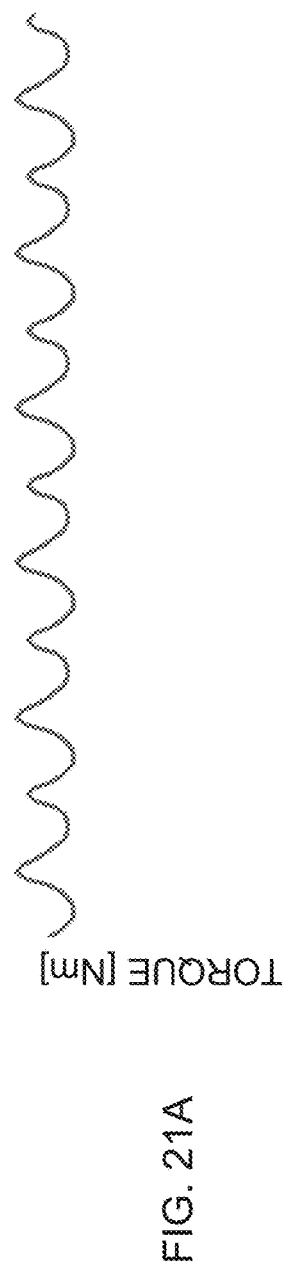
FIGS. 21A and 21B are graphs illustrating a torque waveform in a case where a sinusoidal current and a distortion wave current flow in a motor having a stator configuration illustrated in FIG. 18.
Figure 21B:
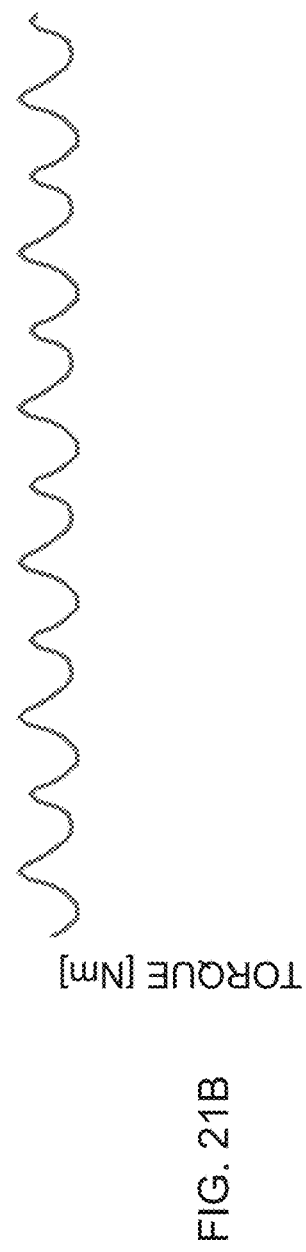
Figure 22A:
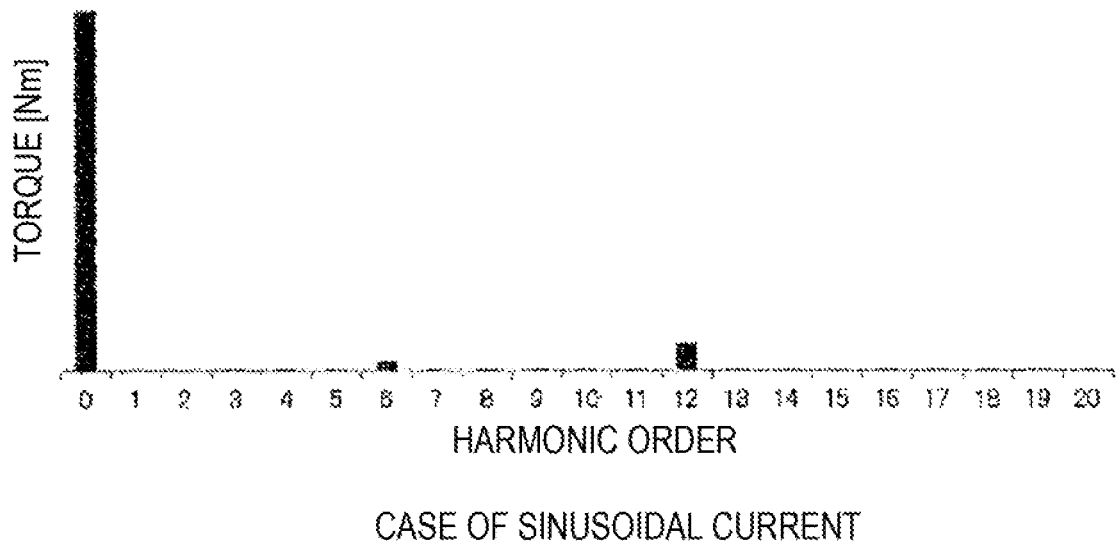
FIGS. 22A and 22B are graphs is a graph illustrating each order component in the torque waveform illustrated in FIG. 21.
Figure 22B:
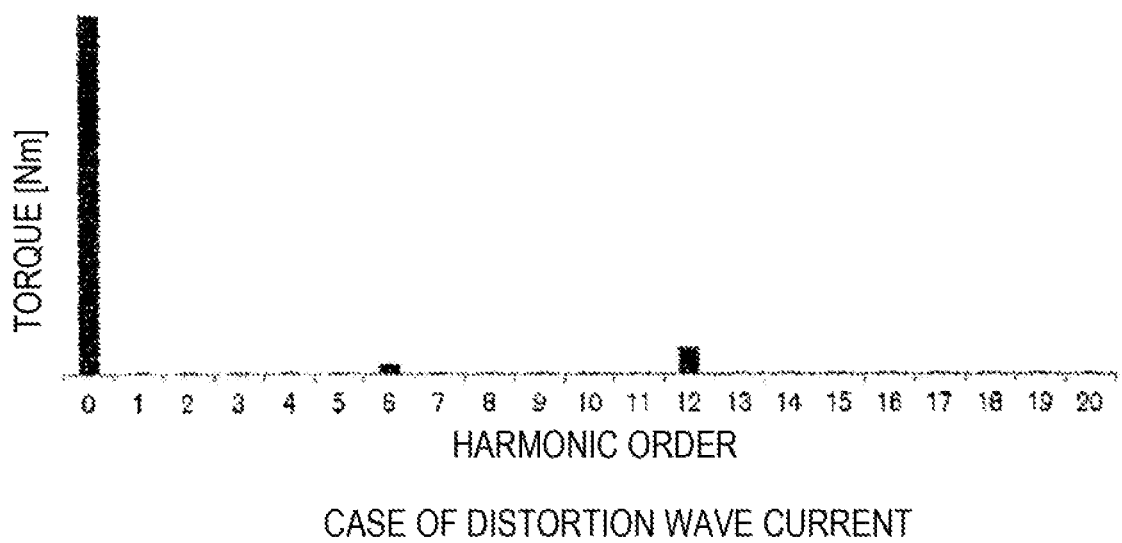

In FIG. 21, a torque waveform of a case where the currents illustrated in FIG. 14 flow in a motor having a stator configuration illustrated in FIG. 18 is illustrated. Also, FIG. 22 is a graph illustrating each order component in the torque waveform illustrated in FIG. 21. In FIG. 21(a), a torque waveform in a case of the sinusoidal current in FIG. 14(a) is illustrated. In FIG. 21(b), a torque waveform in a case of the distortion wave current in FIG. 14(b) is illustrated. The both torque waveforms are substantially the same. Also, with reference to FIGS. 22(a) and (b), it is understood that components in the same order are included in both of a case where the sinusoidal current flows and a case where the distortion wave current flows and that magnitude of the components in the same order is substantially the same.

This can be described from the following. That is, since $E_3=0$ in a case of the stator structure illustrated in FIG. 18, the same equation is acquired in a case of the sinusoidal current and in a case of the distortion wave current when $E_3=0$ is substituted into the equations (12) and (13) expressing instantaneous power and motor torque. That is, with the stator structure illustrated in FIG. 18, it is possible to prevent an increase in a power pulsating component and deterioration in a torque ripple.

As described above, in the present embodiment, a third harmonic induced voltage $E_3$ is made to be $E_3=0$ with a stator structure having a configuration illustrated in FIG. 9, 10, or 18 and generation of a torque ripple due to $I_3$ and $E_3$ is prevented. As a result, even when an inverter voltage including a third harmonic voltage is applied to a motor to increase an output in a six-wire three-phase motor, it is possible to prevent generation of a torque ripple due to the third harmonic voltage and to realize low vibration and small noise while increasing the output.

Then, in a six-wire three-phase motor having a configuration in which a stator structure is in a manner of the configuration in FIG. 9, 10, or 18, the third harmonic induced voltage $E_3$ becomes $E_3=0$. Thus, while a third harmonic current is not generated in a motor current in a case where an inverter applied voltage by sinusoidal modulation is applied, a third harmonic current corresponding to a third harmonic component $V_3$ in an inverter applied voltage is generated in a case where the inverter applied voltage by overmodulation is applied. That is, a third harmonic current component in a motor current of when an overmodulation voltage based on a PWM signal is applied is higher than a third harmonic current component in a motor current of when a sinusoidal modulation voltage based on the PWM signal is applied.

On the other hand, in a case of a stator structure with $E_3 \neq 0$, a third harmonic current due to a third harmonic induced voltage $E_3$ is generated even in a case where an inverter applied voltage by sinusoidal modulation is applied. On the one hand, in a case where an inverter applied voltage by overmodulation is applied, generation of a third harmonic current depends on a third harmonic component $E_3$ in an induced voltage and a third harmonic component $V_3$ in an inverter applied voltage as understood from the equation (1). Thus, when phases of $E_3$ and $V_3$ are the same, a generated third harmonic current becomes higher than that of a case where a sinusoidal modulation voltage is applied. However, in a case where phases are opposite, these cancel each other and there is a case where a generated third harmonic current becomes low or zero. That is, in a case of the stator structure with $E_3 \neq 0$, a third harmonic current does not necessarily become higher in a case where an overmodulation voltage is applied.

Also, in a motor system, such as the motor system 1 illustrated in FIG. 1, including a six-wire three-phase motor 100 having the above-described configuration, and an inverter device 200 that applies an inverter applied voltage by PWM control based on a carrier wave and a signal wave to the motor 100, the signal wave includes a fundamental wave having amplitude higher than amplitude of the carrier wave and a third harmonic signal and has amplitude equal to or lower than the amplitude of the carrier wave.

In such a manner, it is possible to correct a crest value of a signal wave by superimposing a third harmonic to the signal wave. Even when a modulation rate of a fundamental wave is equal to or higher than 1, amplitude of the signal wave can be made equal to or lower than amplitude of a carrier wave as illustrated in FIG. 3(b) and a PWM pulse can be generated without any trouble.

However, since magnitude of a third harmonic included in current flowing in a motor varies depending on magnitude of a superimposed third harmonic, a third harmonic current is preferably as low as possible in order to control a copper loss due to the third harmonic current. As long as a maximum value of a signal wave does not become larger than amplitude of a carrier wave, magnitude of a third harmonic superimposed on the signal wave can be selected freely. Thus, by limiting magnitude of a third harmonic in such a manner that amplitude of a signal wave becomes the same with amplitude of a carrier wave, it is possible to control generation of a copper loss and to prevent deterioration in efficiency.

In a case where distributed winding in which a pitch of a winding wire becomes ⅔ (=120°/180°) is employed as illustrated in FIG. 9 or a case where concentrated winding wound in two poles at three slots is employed as illustrate in FIG. 10, a third harmonic component is included in a gap flux density distribution but is canceled when being interlinked with a winding wire. Thus, a third harmonic component is not included in an induced voltage. Thus, it is possible to prevent generation of a torque ripple due to $I_3$ and $E_3$.

Note that similarly to a case of two-pole three-slot concentrated winding, it is possible to prevent a third harmonic component from being included in an induced voltage in a case of four-pole three-slot concentrated winding. Also, in a case of distributed winding in a phase belt, it is possible to prevent a third harmonic component from being included in an induced voltage by making a pitch ⅔ as illustrated in FIG. 18.

Motors illustrated in FIG. 9 and FIG. 10 are summarized as follows. A motor illustrated in FIG. 9 is a six-wire three-phase motor including: a stator including a winding wire wound independently between phases; and a rotor including a plurality of magnets in a circumferential direction, wherein the winding wire is wound by distributed winding, in which a pitch of the winding wire becomes ⅔, and is configured in such a manner that a third harmonic current component in a motor current of when an overmodulation voltage based on a PWM signal is applied becomes higher than a third harmonic current component in a motor current of when a sinusoidal modulation voltage based on the PWM signal is applied. That is, since a third harmonic component is not included in an induced voltage generated due to a magnet in a case of distributed winding in which a winding wire pitch becomes ⅔, a third harmonic current component in a motor current of when an overmodulation voltage based on a PWM signal is applied becomes higher than a third harmonic current component in a motor current of when a sinusoidal modulation voltage based on the PWM signal is applied.

Also, a motor illustrated in FIG. 10 is a six-wire three-phase motor including: a stator including a winding wire wound independently between phases; and a rotor including a plurality of magnets in a circumferential direction, wherein the winding wire is wound by two-pole three-slot or four-pole three-slot concentrated winding and is configured in such a manner that a third harmonic current component in a motor current of when an overmodulation voltage based on a PWM signal is applied becomes higher than a third harmonic current component in a motor current of when a sinusoidal modulation voltage based on the PWM signal is applied. That is, since a third harmonic component is not included in an induced voltage generated due to a magnet in a case of a winding wire wound by two-pole three-slot or four-pole three-slot concentrated winding, a third harmonic current component in a motor current of when an overmodulation voltage based on a PWM signal is applied becomes higher than a third harmonic current component in a motor current of when a sinusoidal modulation voltage based on the PWM signal is applied.

Second Embodiment

In the above-described first embodiment, a third harmonic induced voltage $E_3$ is made to be $E_3=0$ with a stator structure having a configuration illustrated in FIG. 9, 10, or 18 and generation of a torque ripple due to $E_3$ and a third harmonic current $I_3$ flowing in a motor is prevented. On the other hand, in the second embodiment, a third harmonic induced voltage $E_3$ is reduced and a torque ripple due to $I_3$ and $E_3$ is controlled with a contrivance in a structure on a side of a rotor.

FIG. 23 is a view for describing a rotor structure in the second embodiment. Note that a stator structure is similar to a stator structure of the motor illustrated in FIG. 8, and a winding wire is wound by distributed winding at an electrical angle 180°. As described above, in order to increase an output of a motor, it is effective to superimpose a third harmonic on an inverter applied voltage and to increase a fundamental wave voltage. However, when a third harmonic current $I_3$ flows in the motor due to the third harmonic included in the inverter applied voltage, a torque ripple is increased and vibration or noise is increased.

In a rotor 111 illustrated in FIG. 23, when a circumferential direction angle of a permanent magnet 112 is θ° at an electrical angle, a ratio between the angle θ and an electrical angle 180° of a magnetic pole pitch (θ/180) is called a pole-arc ratio. Also, a part 114a of a rotor core 114 between two adjacent permanent magnets 112 is called an auxiliary magnetic pole. A distribution of magnetic flux density formed in a gap between the rotor 111 and a stator 110 is determined according to the permanent magnet 112 and the auxiliary magnetic pole 114a. That is, the magnetic flux density distribution depends on the pole-arc ratio.

Figure 24:
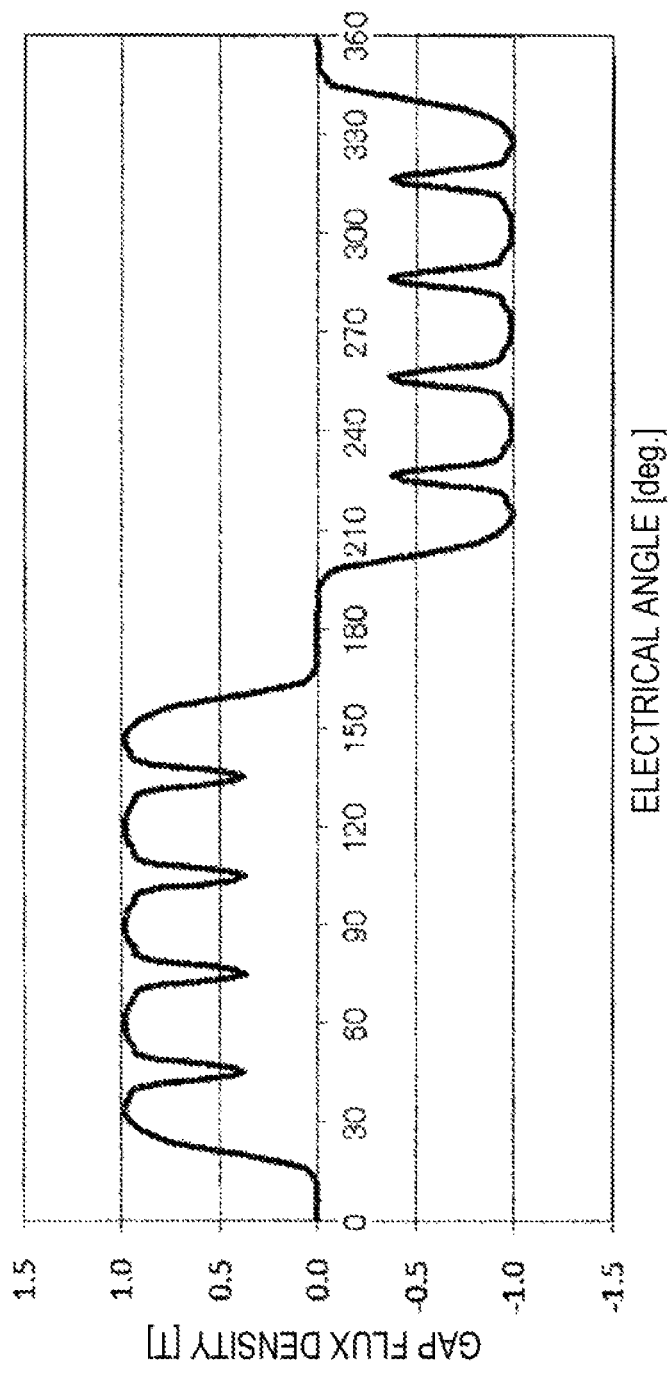
FIG. 24 is a graph illustrating an example of a distribution of gap flux density.

FIG. 24 is a graph illustrating an example of a distribution of gap flux density (magnetic flux density in gap). It is understood that the gap flux density is not sinusoidal and includes a harmonic due to an influence of a shape of the permanent magnet 112 or a slot in which an armature winding wire is provided.

FIG. 25(a) is a graph illustrating how a fundamental wave (first) component and a third harmonic component included in a gap flux density distribution vary according to a pole-arc ratio, a horizontal axis indicating the pole-arc ratio. Also, FIG. 25(b) is a graph illustrating a relationship between an induced voltage (no-load induced voltage) and a pole-arc ratio. Each of lines L21 and L31 indicates a fundamental wave component and each of lines L23 and L33 indicates a third harmonic component.

In the example illustrated in FIG. 25, at θ=0.6667(=120°/180°), a third harmonic component in the magnetic flux density distribution and a third harmonic induced voltage are the lowest (=0). That is, by setting a pole-arc ratio to θ=0.6667, it is possible to make a third harmonic induced voltage $E_3$ related to generation of a torque ripple the lowest. As a result, even when a third harmonic component is included in an inverter applied voltage, it is possible to control generation of power pulsating and torque pulsating due to the third harmonic component.

As described above, in the second embodiment, in a configuration in which a magnetic flux density distribution in a gap is determined by configurations of the permanent magnet 112 and the auxiliary magnetic pole 114a as illustrated in FIG. 23, it is possible to prevent a third harmonic induced voltage $E_3$ from being included in an induced voltage by setting a pole-arc ratio θ of the permanent magnet 112 to ⅔. As a result, it is possible to control generation of a torque ripple due to a third harmonic component $I_3$ in a motor current and a third harmonic induced voltage $E_3$.

By setting a pole-arc ratio in a manner of the present embodiment, it is possible to make a third harmonic induced voltage $E_3$ substantially zero. Thus, while a third harmonic current is not generated in a motor current in a case where an inverter applied voltage by sinusoidal modulation is applied, a third harmonic current corresponding to a third harmonic component $V_3$ of an inverter applied voltage is generated in a case where the inverter applied voltage by overmodulation is applied. That is, a third harmonic current component in a motor current of when an overmodulation voltage based on a PWM signal is applied is higher than a third harmonic current component in a motor current of when a sinusoidal modulation voltage based on the PWM signal is applied.

For example, a distribution of gap flux density generated by the permanent magnet 112 provided in the rotor core 114 can be changed according to a shape, the number, and an arrangement of permanent magnets 112, including the above-described pole-arc ratio. Then, by changing these and making a third harmonic component in a magnetic flux density distribution, it is possible to prevent a third harmonic component from being included in an induced voltage. An element (parameter) to determine a distribution of gap flux density is not limited to a shape, the number, or an arrangement of permanent magnets 112. Then, by adjusting a parameter to determine a distribution of gap flux density, it is possible to prevent a third harmonic component from being included in an induced voltage.

A motor of the second embodiment is summarized as follows. A motor configured in a manner illustrated in FIG. 23 and FIG. 25 is a six-wire three-phase motor including: a stator including a winding wire wound independently between phases; and a rotor including a plurality of magnets in a circumferential direction, wherein the rotor is configured in such a manner that a pole-arc ratio of the magnets is ⅔ and a third harmonic current component in a motor current of when an overmodulation voltage based on a PWM signal is applied becomes higher than a third harmonic current component in a motor current of when a sinusoidal modulation voltage based on the PWM signal is applied. That is, since a third harmonic component is not included in an induced voltage generated due to a magnet in a case where a pole-arc ratio of the magnet is ⅔, a third harmonic current component in a motor current of when an overmodulation voltage based on a PWM signal is applied becomes higher than a third harmonic current component in a motor current of when a sinusoidal modulation voltage based on the PWM signal is applied.

Note that in the second embodiment, a stator structure is similar to that in a case of FIG. 8. Even with such a stator structure, a third harmonic component is prevented from being included in an induced voltage with a contrivance in a pole-arc ratio on a side of a rotor. However, a stator structure of the first embodiment may be employed and a rotor configuration of the second embodiment may be further applied.

In the above, various embodiments and modification examples have been described. However, the present invention is not limited to these contents. A different mode that can be considered within the scope of a technical idea of the present invention is also included in the scope of the present invention.

REFERENCE SIGNS LIST 1 motor system
100 motor
110 stator
111 rotor
112 permanent magnet
121a, 121b, 121c armature winding wire
200 inverter device
203 controller
210 inverter circuit

The invention claimed is:

1. A six-wire three-phase motor comprising:
a stator including a winding wire wound independently between phases; and
a rotor including a plurality of magnets in a circumferential direction,
wherein the stator or the rotor is configured in such a manner that a third harmonic current component in a motor current of when an overmodulation voltage based on a PWM signal is applied becomes higher than a third harmonic current component in a motor current of when a sinusoidal modulation voltage based on the PWM signal is applied, and
wherein the winding wire is arranged in the stator with a pitch of ⅔ of a magnetic pole pitch.

2. The six-wire three-phase motor according to claim 1, wherein an induced voltage generated in the winding wire due to the magnets includes no third harmonic component.

3. The six-wire three-phase motor according to claim 2, wherein the winding wire is arranged in the stator such that no third harmonic component is included in the induced voltage generated due to the magnets.

4. The six-wire three-phase motor according to claim 3, wherein the stator is a two-pole three-slot concentrated winding stator or four-pole three-slot concentrated winding stator.

5. The six-wire three-phase motor according to claim 2, wherein a pole-arc ratio of the magnets is ⅔.

6. An inverter device that applies an inverter applied voltage by PWM control based on a carrier wave and a signal wave to the six-wire three-phase motor according to claim 1,
wherein the signal wave includes a fundamental wave having amplitude higher than amplitude of the carrier wave and a third harmonic signal and has amplitude equal to or lower than the amplitude of the carrier wave.

7. A motor system comprising:
the six-wire three-phase motor according to claim 1; and
an inverter device that applies an inverter applied voltage by PWM control based on a carrier wave and a signal wave to the six-wire three-phase motor,
wherein the signal wave includes a fundamental wave having amplitude higher than amplitude of the carrier wave and a third harmonic signal and has amplitude equal to or lower than the amplitude of the carrier wave.

* * * * *